US011919026B1

(12) United States Patent
Cook et al.

(10) Patent No.: US 11,919,026 B1
(45) Date of Patent: Mar. 5, 2024

(54) SYSTEM, APPARATUS, AND METHOD FOR DEFLECTED THERMAL SPRAYING

(71) Applicant: Flame-Spray Industries, Port Washington, NY (US)

(72) Inventors: David J. Cook, Naperville, IL (US); Keith A. Kowalsky, Oyster Bay, NY (US)

(73) Assignee: Flame-Spray Industries, Inc., Port Washington, NY (US)

( * ) Notice: Subject to any disclaimer, the term of this patent is extended or adjusted under 35 U.S.C. 154(b) by 0 days.

(21) Appl. No.: 15/993,662

(22) Filed: May 31, 2018

(51) Int. Cl.
*B05B 7/22* (2006.01)
*C23C 4/12* (2016.01)
*C23C 4/134* (2016.01)

(52) U.S. Cl.
CPC .............. *B05B 7/226* (2013.01); *B05B 7/224* (2013.01); *C23C 4/12* (2013.01); *C23C 4/134* (2016.01)

(58) Field of Classification Search
CPC ...................... C23C 4/12–16; B05B 7/22–226
See application file for complete search history.

(56) References Cited

U.S. PATENT DOCUMENTS

| | | | | | |
|---|---|---|---|---|---|
| 5,269,462 | A * | 12/1993 | Suzon | C23C 4/12 | 239/552 |
| 5,908,670 | A * | 6/1999 | Dunkerley | B05B 13/0636 | 239/81 |
| 8,581,138 | B2 * | 11/2013 | Kowalsky | B05B 7/224 | 219/121.47 |
| 2002/0185473 | A1 * | 12/2002 | Carlson | B05B 7/224 | 219/76.15 |
| 2005/0223977 | A1 * | 10/2005 | Vardelle | B23K 10/006 | 118/715 |
| 2010/0151124 | A1 * | 6/2010 | Xue | B05B 7/1486 | 427/185 |

* cited by examiner

*Primary Examiner* — Dah-Wei D. Yuan
*Assistant Examiner* — Stephen A Kitt

(57) ABSTRACT

A system (100), apparatus (110), and method (900) for creating a particle stream (70) that is deflected with a secondary gas (518) such as air before coming into contact with the treated substrate surface (80). The system (100) can be implemented as an improvement to a prior art PTWA (plasma transferred wire arc) thermal spraying apparatus (50) by using a non-symmetrical passageway configuration (549). Such a configuration can be an attribute of a nozzle (220) or a secondary gas director (576) such as an air baffle (578).

20 Claims, 30 Drawing Sheets

SYSTEM, APPARATUS, AND METHOD FOR DEFLECTED THERMAL SPRAYING

BACKGROUND OF THE INVENTION

The invention relates generally to the spraying of a substance onto a surface. More specifically, the invention is a plasma transferred wire arc ("PTWA") system, apparatus, and method for deflected thermal spraying (collectively, the "system").

A. Plasma

There are four "states of matter" in physics. Matter can take the form of: (1) a solid; (2) a liquid; (3) a gas; or (4) a plasma. Plasma is an ionized gas consisting of positive ions and free electrons in equal proportions resulting in essentially no overall electric charge. Like a gas, plasma does not have a definitive shape or volume. It will expand to fill the space available to it. Unlike gases, plasmas are electrically conductive. Plasma conducts electricity, produces magnetic fields, and responds to electromagnetic forces. In plasma, positively charged nuclei travel in a space filled of freely moving disassociated electrons. These freely moving electrons allow matter in a plasma state to conduct electricity.

Although the term "plasma" is not commonly used outside the context of science and engineering, there are many common examples of plasma that people encounter in everyday life. Lightning, electric sparks, fluorescent lights, neon lights, and plasma televisions are all examples of plasma. Gas is typically converted into a state of plasma through heat (e.g. high temperatures) or electricity (e.g. a high voltage difference between two points).

B. Thermal Spraying

Thermal spraying is a process by which a material is sprayed onto a surface with the purpose of improving the surface that is being sprayed. There are many different types of thermal spraying, including, but not limited to: plasma spraying; detonation spraying; wire arc spraying; plasma transferred wire arc spraying; flame spraying; high velocity oxy-fuel coating spraying ("HVOF"); warm spraying; and cold spraying.

Two of these thermal spraying techniques involve the use of plasma, plasma spraying and plasma transferred wire arc spraying. Plasma spraying involves the introduction of feedstock, which can be in the form of a powder, a liquid, a ceramic feedstock that is dispersed in a liquid suspension, or a wire that is introduced into a plasma jet created by a plasma torch. Plasma transferred wire arc ("PTWA") spraying is plasma spraying when the feedstock is electrically part of the circuit and is in the form of a wire.

C. PTWA—Plasma Transferred Wire Arc technology

PTWA can be used to enhance the surface properties of components. Treated components can be protected against extreme heat, abrasion, corrosion, erosion, abrasive wear, and other environmental and operational conditions that would otherwise limit the lifespan and effectiveness of the treated component. Overall durability is enhanced, while at the same time PTWA can also be used to achieve the following advantages with respect to treated components: (1) reductions in weight; (2) cost savings; (3) reduction in friction; (4) and a reduction of stress. In the context of vehicles such as automobiles, PTWA treatment of engine components such as cylinder bores can result in increased fuel economy and lower emissions. PTWA can also be useful in refurbishing old parts as well as in enhancing new parts.

The inputs of a PTWA system are electricity, gas, and consumable feedstock. The consumable feedstock is. the wire that is atomized by a plasma arc created between the cathode and the free end of the wire. The output of a PTWA system is a plasma arc between a cathode and an anode, where the anode is an open end of a consumable wire. The plasma spray is what enhances the surface properties of a component or surface being treated. Feedstock in a PTWA system is delivered to the plasma torch in the form of the wire. Electric current travels through the wire as the free end of the wire is moved to where the generated plasma exits the nozzle of the plasma torch. In many PTWA systems, the torch assembly revolves around a longitudinal axis of the wire feedstock while maintaining an electrical connection, a plasma arc, between the cathode of the plasma torch and the open end of the wire feedstock. In some embodiments, there is an offset between the longitudinal axis of the wire feedstock and the center of revolution (from the perspective of a cathode revolving around a center point) or the center of rotation (from the perspective of a cathode and surrounding empty space rotating around a center point). See U.S. Pat. No. 8,581,138 which discloses a thermal spray technology "wherein the method includes the steps of offsetting the central axis of a consumable wire with respect to an axial centerline of a constricting orifice."

PTWA technology can provide highly desirable benefits in the treatment of components used in a wide variety of different industries, including but not limited to: aerospace; automotive; commercial vehicles; heavy industrial equipment; and rail.

D. Operating Parameters

The correct functioning of a PTWA system typically requires the tight coordination of three key parameters: (1) a straight and rapidly traveling feed wire between about 100-500 inches/minute; (2) stable current traveling through the rapidly traveling feed wire; and (3) a consistent gas flow/pressure sufficient for sustaining stable plasma temperatures typically between 6,000 and 20,000 degrees Celsius. If one or more of the parameters of a PTWA system fall outside the desired ranges, inconsistent melting of the feed wire can result. Such inconsistency can negate the desired advantages of PTWA spraying.

The correct functioning of a PTWA system requires the coordination of different variables under substantially tight constraints. Operations outside those constraints are not necessarily visible to the human eye unless the undesirable effects are severe. For example, a PTWA system functioning outside of desired parameters can result in "spitting" because the system will project large molten globules instead of finely atomized particles onto the surface being treated by the PTWA system. Even before visible "spitting" occurs, the operation of a PTWA system with even one parameter outside of an acceptable range can be highly undesirable.

E. Use of Secondary Gas

Prior art PTWA systems utilize secondary gas such as air to direct the particle stream in manner so that the particle stream impacts the targeted surface in the desired manner. In most instances, secondary gas is directed through the nozzle to a help shape the particle stream in a substantially symmetrical and collimated manner, with the sprayed particle stream being perpendicular to the wire. The centerline of the particle stream is typically in line with the horizontal plane (the plane that is perpendicular to the wire). The particle stream is typically directed in the same direction as the center vector.

The prior art presumes that the symmetrical direction of secondary gas to the particle stream is the optimal approach for quality coatings. The prior art affirmatively teaches away from the concept that the horizontal deflection of the particle stream is desirable. Such deflection significantly reduces collimation in the spray pattern and changes the geometry of the spray pattern. In the context of a cathode that rotates around the wire, it is counter-intuitive in the prior art to purpose deflect the particle stream against the direction of the cathode rotation or even in the same direction as the rotation of the cathode. Despite the teachings and assumptions of the prior art, horizontal deflection can be highly desirable.

The system can be further understood as described in the Summary of the Invention section set forth below.

SUMMARY OF THE INVENTION

The invention relates generally to the spraying of a substance onto a surface. More specifically, the invention is a plasma transferred wire arc ("PDA/A") system, apparatus, and method for deflected thermal spraying (collectively, the "system").

The system can be conceptualized and implemented as an improvement to a wide range of prior art spraying devices and plasma torches, but is particularly useful, novel, and non-obvious in the context of PTWA technology.

In many embodiments, the deflection of the particle stream is effectuated by non-symmetrical passageways of secondary gas within the nozzle. In other embodiments, the non-symmetrical passageways are attributable to another component such as an air baffle or other form of secondary gas director. other components possess the non-symmetrical. Deflection can occur horizontally (left or right in the plane that is perpendicular to the wire), vertically (up or down relative to the wire), or both horizontally and vertically at the same time.

The system can be implemented in a wide variety of different ways using a wide variety of different components and configurations. Virtually any PTWA system in the prior art can incorporate and benefit by horizontally deflecting the particle stream in certain contexts.

BRIEF DESCRIPTION OF THE DRAWINGS

Many features and inventive aspects of the system are illustrated in the Figures which are described briefly below. However, no patent application can disclose all potential embodiments of an invention through text descriptions or graphical illustrations. In accordance with the provisions of the patent statutes, the principles and modes of operation of the system are explained and illustrated with respect to certain preferred embodiments. However, it must be understood that the components, configurations, and methods described above and below may be practiced otherwise than is specifically explained and illustrated without departing from its spirit or scope. Each of the various elements described in the glossary set forth in Table 1 below can be implemented in a variety of different ways while still being part of the spirit and scope of the invention.

FIG. 2*a* illustrates an example of horizontal deflection in the context of a top view and vertical deflection in the context of a side view. FIG. 2*a* serves as a direct contrast to a non-deflected particle stream in FIG. 1*a*.

FIG. 2*b* serves as a direct contrast to the non-deflected particle stream in FIG. 1*b*.

FIG. 3*b* is similar to FIG. 3*a*, except that the non-symmetrical configuration originates anywhere within the system, and not necessarily within the nozzle.

FIG. 3*d* is similar to FIG. 3*c*, except that the passageways in FIG. 3*d* are not necessarily within the nozzle.

FIG. 3*f* is similar to FIG. 3*e*, except that the passageways in the FIG. 3*f* are not nozzle passageways.

FIG. 3*h* is similar to FIG. 3*g*, except that the passageways in the FIG. 3*h* are not nozzle passageways.

FIG. 3*j* is similar to FIG. 3*i*, except that the passageways in the FIG. 3*j* are not nozzle passageways

FIG. 3*l* is a cross sectional side view diagram illustrating an example of a secondary gas director with a non-symmetrical passageway configuration in the angles of passageways are different. FIG. 3*l* is similar to FIG. 3*k*, except that the passageways in the FIG. 3*l* are not nozzle passageways.

FIG. 3*n* is similar to FIG. 3*m*, except that the passageways in the FIG. 3*n* are not nozzle passageways.

FIG. 3*p* is similar to FIG. 3*o*, except that the passageways in the FIG. 3*p* are not nozzle passageways.

FIG. 3*r* is similar to FIG. 3*q*, except that the passageway in the FIG. 3*r* are not a nozzle passageway.

Figure 1A:
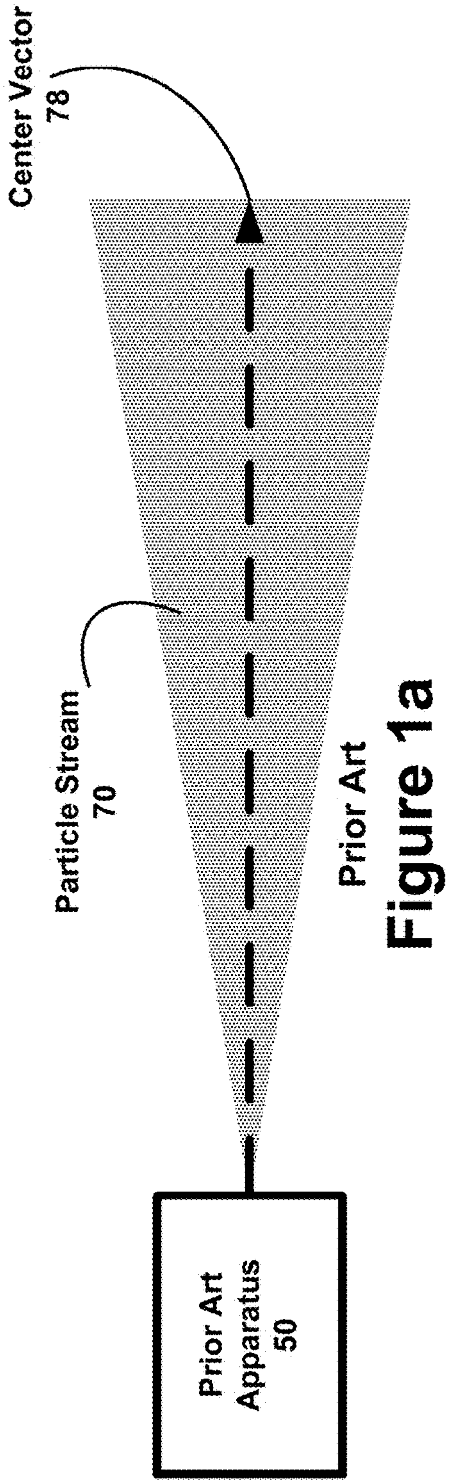
Prior Art Figure 1a
FIG. 1*a* is block diagram illustrating an example of a particle stream that is created using a prior art PTWA system in which secondary gas is directed to the particle stream in a symmetrical manner. The particle stream in FIG. 1*a* is not deflected.

The drawings described briefly above can be further understood in accordance with the Detailed Description section set forth below.

DETAILED DESCRIPTION

The invention relates generally to the spraying of a substance onto a surface. More specifically, the invention is a plasma transferred wire arc ("PTWA") system, apparatus, and method for deflected thermal spraying (collectively, the "system").

I. GLOSSARY/TERMINOLOGY

All element numbers referenced in the text below are listed in Table 1 along with an element name and definition/description.

TABLE 1

| Element Number | Element Name | Element Definition/Descriptions |
|---|---|---|
| 50 | Prior Art Apparatus | A prior art PTWA (plasma transferred wire arc) thermal spraying apparatus that forms a plasma arc 60 between a cathode 212 and a free end 370 of a wire 310. |
| 60 | Plasma Arc | An arc of ionized gas forming between a cathode 212 and a free end 370 of a wire 310. The plasma arc 60 is comprised of a jet of very hot plasma produced from electric current 490 traveling through ionized plasma gas 516 in the space between the cathode 212 and the wire 310. |
| 61 | Gap | The space between the cathode 212 and the free end 370 of the wire 310. The plasma arc 60 is formed in the gap 61. |
| 62 | Plasma Plume | The area surrounding a plasma arc 60 where non-atomized particles 72 are atomized. |

TABLE 1-continued

| Element Number | Element Name | Element Definition/Descriptions |
|---|---|---|
| 64 | Zone | An area or location beyond the melting of the free end 370 of the wire 310. The zone 64 can also be referred to as a wire-plasma intersection zone. |
| 66 | Vector Forces | Forces pushing particles 70 in the same direction of the ionized plasma gas 516. |
| 68 | Associated Plasma | Plasma that surrounds the plasma plume 62. |
| 70 | Particles or Particle Stream | The system 100 atomizes the particles 70 in the wire 310 and sprays them towards a surface 80. The particles 70 projected towards the surface 80 are originally solid, in the form of the wire 310. A free end 370 of the wire 310 is melted into non-atomized particles 72 and then atomized into atomized particles 74 which are then sprayed on the desired surface 80. The purpose of the system 100 is to generate a particle stream 70 of atomized particles 74. As a practical matter, some quantity of non-atomized particles 72 will be included in the particle stream 70. The further from optimal the operation of the system 100 becomes, the greater the ratio of non-atomized particles 72 to atomized particles 74. |
| 71 | Spit | A more extreme example of non-atomized particles 72 in the particle stream 70 that is visible to the human eye. The existence of spit 71 in the particle stream 70 means that operation of the system 100 is likely not satisfactory. Spit 71 is a manifestation of a system 100 in which the various processes and components of the system 100 are not configured and synchronized for the system 100 to function in a desirable fashion. |
| 72 | Non-Atomized Particles | Particles 70 from the wire 310 that have been melted or partially melted, but not fully atomized. In the theoretically optimal and aspirational operation of the system 100, the particle stream 70 is comprised entirely of atomized particles 74. Realistically however, there will also be non-atomized particles 72 in the particle stream 70. As the operation of the system 100 falls further away from optimal, the non-atomized particles 72 can be in the form of spit 71. Non-atomized particles 72 can also often be referred to as molten metal particles since at the applicable temperature, the metal material from the wire 310 will be in a molten or at least substantially molten form. |
| 74 | Atomized Particles | Particles 70 from the wire that are in a sufficiently fine form as to be suitable for spraying on the surface 80 of the substrate 84. |
| 76 | Center Line | A geometric line through the center of the particle stream that is equidistant from the sides of the particle stream 70. When the particle stream 70 is not a deflected particle stream 90, the center vector 78 is in line with the center line 76. When the particle stream 70 is a deflected particle stream 90, the center line 76 is deflected relative to the center vector 78. |

TABLE 1-continued

| Element Number | Element Name | Element Definition/Descriptions |
| --- | --- | --- |
| 78 | Center Vector | Typically, the center vector 78 is perpendicular to the wire 310 and in line with the opening 224. When the particle stream 70 is not a deflected particle stream 90, the center vector 78 is in line with the center line 76. The center vector 78 is the same regardless of whether the particle stream 70 is or is not deflected. |
| 80 | Surface | The exterior face or boundary of the substrate 84 which is being sprayed with particles 70 from the system 100. |
| 82 | Deposit | In a properly functioning system 100, the deposit 82 is the buildup of atomized particles 74 sprayed onto the surface 80 by the system 100 or apparatus 110. Realistically, the deposit 82 is likely to include some quantity of non-atomized particles 72. A deposit 82 of spit 71 is typically unacceptable. |
| 84 | Substrate | The material being sprayed on by the system 100 or apparatus 110. The deposit 82 is formed from spraying the particles 70 onto the surface 80 of the substrate 84. |
| 90 | Deflected Particle Stream | A particle stream 70 that has a center line 76 that is not in line with center vector 78. A deflected particle stream 90 has a deflection angle that is not zero. A deflected particle stream 90 can be deflected horizontally (e.g. horizontal deflection 91), vertically (e.g. vertical deflection 92), or both vertically and horizontally at the same time. |
| 91 | Horizontal Deflection or a Horizontally Deflected Particle Stream | Deflection of the particle stream 70 that occurs in the horizontal plane, the plane that is perpendicular to the wire 310 and in line with the opening 224. The deflection direction 94 is to the left or to the right relative to a non-deflected particle stream 70. |
| 92 | Vertical Deflection or a Vertically Deflected Particle Stream | Deflection of the particle stream 70 that occurs in the vertical plane, the plane containing the line of the wire 310 and the line of the opening 224 of the nozzle 220. The deflection direction 94 is up or down relative to a non-deflected particle stream 70. |
| 94 | Deflection Direction | The direction in which a particle stream 70 is deflected. |
| 96 | Deflection Angle | An angular measurement of the deflection in a center line 76 from the center vector 78. |
| 97 | Horizontal Deflection Angle | The deflection angle 96 with respect to horizontal deflection 91. |
| 98 | Vertical Deflection Angle | The deflection angle 96 with respect to vertical deflection 92. |
| 100 | Plasma Arc Thermal Spray System Or System | A PTWA (plasma transferred wire arc) system for projecting (i.e. spraying) atomized particles 74 onto a surface 80 of a substrate 84. The system 100 can utilize a cartridge 560 in which a plasma gas director 571 is integral with a secondary gas director 576. The PTWA system 100 can be referred to simply as the system 100. The system 100 can be implemented in a wide variety of embodiments, including a variety of different apparatuses 110 and methods 900. |
| 110 | Plasma Arc Thermal Spray Apparatus | A plasma arc thermal spray system 100 that is implemented in the form of a device that is at least partially constrained within a housing. |
| 200 | Torch Assembly | An aggregate configuration of subassemblies, components, and parts that provide for the creation and |

TABLE 1-continued

| Element Number | Element Name | Element Definition/Descriptions |
|---|---|---|
| | | sustaining of a plasma arc 60 from the cathode 212 to a free end 370 of a wire 310. The inputs for the torch assembly 200 are electricity 490 from a power delivery assembly 400, a wire 310 from a wire delivery assembly 300, and a gas 510 from a gas delivery assembly 500. |
| 202 | Torch Body | The torch assembly 200 enclosed in an exterior surface. |
| 206 | Rotational Centerline | A central axis around which the cathode 212 revolves around in an orbit 280 that is typically at least substantially circular in shape. In some embodiments, the rotational centerline 206 is the position of the wire 310. In other embodiments, there is an offset between the position of the wire 310 and the rotational centerline 206 (see U.S. Pat. No. 8,581, 138 which is hereby incorporated by reference in its entirety). |
| 210 | Cathode Subassembly | An aggregate configuration of components and parts that support the functionality of the cathode 212 within the torch assembly 200. |
| 212 | Cathode | A negatively charged electrode used to form the plasma arc 60. |
| 214 | Cathode Holder | A structure that secures the position of the cathode 212 relative to the other components of the torch assembly 200 and the various inputs delivered to the torch assembly 200. |
| 220 | Nozzle | A projecting spout through which something flows in an outward direction. |
| 222 | Plasma Nozzle | A nozzle 220 through which plasma gas 512 exits. |
| 224 | Constricting Orifice or Opening | An opening or passageway within the nozzle 220 that narrows as the plasma gas 512 travels through it. The constricting orifice 224 can be referred to simply as the opening 224. The opening 230 is typically perpendicular to the surface 80 being sprayed and in line with the particle stream 70, but the system 100 can be implemented such that the opening 230 is not perpendicular to the surface 80 |
| 226 | Annulus nozzle | A plasma nozzle 222 that has one nozzle passageway 240 with multiple inlets 245. An annulus nozzle 226 is typically cone shaped. |
| 240 | Nozzle Passageway | A passageway 540 or a portion thereof that exists in the nozzle 220 through which the secondary gas 518 passes through the nozzle 220 to reach the particle stream 70 that is directing the secondary gas 518. Attributes of a nozzle passageway 240 that can result in a non-symmetrical nozzle passageway configuration 249 include but are not limited to size 241, shape 242, angle 243, location 244, and inlet 245. |
| 241 | Passageway Size or Size | A quantitative metric, such as distance, area, or volume that describes the magnitude of the nozzle passageway 240. Some embodiments of the system 100 may utilize differences in passageway sizes 241 to create a non-symmetrical nozzle passageway configuration 249. |
| 242 | Passageway Shape or Shape | Geometric information about a nozzle passageway 240 that remains when location, scale, orientation, and reflection are removed. Some |

TABLE 1-continued

| Element Number | Element Name | Element Definition/Descriptions |
| --- | --- | --- |
| | | embodiments of the system 100 may utilize differences in passageway shapes 242 to create a non-symmetrical nozzle passageway configuration 249. |
| 243 | Passageway Angle or Angle | The angle at which a passageway 240 directs secondary gas 518 to the particle stream 70. Some embodiments of the system 100 may utilize differences in passageway angles 243 to create a non-symmetrical nozzle passageway configuration 249. The angle 243 is measured relative to a center vector 78 in the nozzle 220. |
| 244 | Passageway Location or Location | A position of a passageway 240 on the nozzle 220. Some embodiments of the system 100 may utilize differences the layout of passageway locations 244 to create a non-symmetrical nozzle passageway configuration 249. Symmetrical locations 244 are even spaced around a hypothetical center point in the nozzle 220. |
| 245 | Passageway Inlet or Inlet | An entry opening into a passageway 240 in the nozzle 220. In many embodiments, each nozzle passageway 240 will have only one inlet 245, but it is possible for a single nozzle passageway 240 to have 2 or more inlets 245. |
| 249 | Non-Symmetrical Nozzle Passageway Configuration | A configuration of nozzle passageways 240 that causes the particle stream 70 to be a deflected particle stream 90. The absence of symmetry can be achieved in a variety of different ways, such as through a difference in nozzle passageway size 241, nozzle passageway shape 242, nozzle passageway angle 243, and/or through a non-symmetrical arrangement of nozzle passageway locations 244 (such as non-symmetrical nozzle passageway locations 244 or symmetrical locations 244 with one or more locations devoid of nozzle passageways 240). In many embodiments of the system 100, the non-symmetrical structure of a non-symmetrical passageway configuration 549 will be located within the nozzle 220 as a non-symmetrical nozzle passageway configuration 249. |
| 280 | Orbit or Rotation | A pathway around a rotational centerline 206 that is typically at least substantially circular in shape. Much of the literature on prior art PTWA 50 describes this movement as a rotation around the rotational centerline 206 by the cathode 212. |
| 282 | Radial Distance | The distance between a cathode 212 (in an orbit 280 around the free end 370 of a wire 210) and the free end 370 of the wire around which the cathode 212 moves. The system 100 can be implemented such that the radial distance can be less than about 35 mm, or even less than about 25 mm. |
| 290 | Over Spray Shield | A component that blocks the spray 70 from being directed to an undesirable location. |
| 300 | Wire Delivery Assembly | An aggregate configuration of components that provide for the movement of the wire 310 towards the position where a free end 370 of the wire 310 is positioned for the plasma arc 60. The wire delivery assembly 300 can also be referred to as a wire assembly 300. |

TABLE 1-continued

| Element Number | Element Name | Element Definition/Descriptions |
|---|---|---|
| 310 | Wire | A material in the shape of a slender, string-like piece or filament. The wire 310 is comprised of the matter from which the atomized particles 74 are derived and directed to the surface 80 of the substrate 84. The wire 310 is typically made of metal, but can also be made of ceramic in a metal sheath which is known as a chord wire. |
| 320 | Feedstock | A portion of the wire 310 that is the opposite end to the free end 370. Feedstock 320 can also be referred to as the wire base or wire supply. Feedstock 320 is the portion of the wire 310 that is not yet within the rollers 340, the contact tip 422, or the guide tip 330. The feedstock 320 is where the supply of wire 310 is positioned and stored until the speed-controlled motor 350 moves the particular portion of the wire 310. |
| 330 | Guide Tip | A hollow structure through which the wire 310 moves. The guide tip 330 is often the final structure that helps position the wire 310 and more specifically the free end 370 of the wire 310 at the desired position for the creation and sustaining of a plasma arc 60. This is sometimes called a wire guide 330. |
| 332 | Guide Tip Block | This structure provides support for the guide tip 330. It is typically contained within an insulating object 430. |
| 340 | Rollers | Rotating structures that are at least substantially cylindrically shaped. Rollers 340 are powered by the speed-controlled motor 350. Rollers 340 move the wire 310 towards the guide tip 330. |
| 350 | Speed-Controlled Motor | An engine that moves a free end 370 of the wire 310 (with the rest of the wire 310 following) through the wire delivery assembly 300 to the desired position for the plasma arc 60. The speed-controlled motor 350 moves the wire 310 by powering the rollers 340. |
| 352 | Wire Speed | The velocity at which the wire 370 moves towards the gap 61. Wire speed 352 is controlled primarily by the motor 350. |
| 370 | Free End | An end portion of the wire 310 that is melted and atomized within a proper plasma arc 60. The free end 370 of the wire 310 is opposite to the feedstock 320 end. The free end 370 of the wire 310 includes an end tip 371 as well as the portions/lengths of the wire prior to the end tip 371. The free end 370 of the wire 310 is from the end tip 371 to portions of the wire 310 that have just passed through the guide tip 330. |
| 371 | End Tip | The portion of the free end 370 that is the precise end position. |
| 400 | Power Delivery Assembly | An aggregate configuration of subassemblies, components, and parts that collectively provide the electricity 490 used to sustain the plasma arc 60. In most embodiments of the system 100, the power delivery assembly 400 provides for supplying electricity 490 in the form of direct current (DC) electricity 490. The power delivery assembly 400 can also be referred to as a power assembly 400. |
| 410 | Power Supply | A device that provides the electricity 490 for forming the plasma arc 60 from the cathode 212 to the free end 370 of the wire 310. |

TABLE 1-continued

| Element Number | Element Name | Element Definition/Descriptions |
|---|---|---|
| 412 | DC Power Source | A power supply 410 that provides for directing electricity 490 in the form of direct current (DC) along the electrical pathway 492. |
| 420 | Lead/Contact | An electrical connection comprising a length of wire or a metal conductive pad. The power delivery assembly 400 can utilize a wide variety of different leads/contacts 420 to direct electricity 490 throughout the power delivery assembly 400. |
| 422 | Contact Tip | A lead 420 in direct physical contact with the wire 310 that provides for routing electricity 490 to the wire 310. In some embodiments, the contact tip 422 can be made up of two or more pieces such as 422A and 422B, held in spring or pressure load contact with the wire 310 by a rubber ring 432 or other similar structure. |
| 430 | Insulating Object | A structure that does not conduct electricity 490. The system 100 may use various insulating objects 430 to direct electricity 490 through the desired electrical pathway 492. |
| 432 | Rubber Ring | An insulating object 430 typically used to hold the contact tip 422 together with the wire 310 so that the portion of the wire 310 in contact with the contact tip 422 to the free end 370 becomes part of the electrical pathway 492. |
| 434 | Insulating Block | An insulating object 430 that insulates the portion of the wire 310, contact tip 422, and free end 370 from the torch components with the same electrical potential as the cathode 212. |
| 450 | Open Circuit | An unintentional gap in the electrical pathway 492 that can negatively impact the performance of the system 100. An open circuit 450 can also be referred to as a bad contact 450. |
| 490 | Electricity | A form of energy resulting from the existence of charged particles (such as electrons or protons), either statically as an accumulation of charge or dynamically as a current. Electricity 492 is a necessary input for creating and sustaining a plasma arc 60. |
| 492 | Circuit or Electrical Pathway | A route that the electricity 490 forming the plasma arc 60 travels from the power supply 410 to the plasma arc 60 and back again. |
| 500 | Gas Delivery Assembly | An aggregate configuration of subassemblies, components, and parts that collectively provide the gas 510 or gasses 510 used to sustain the plasma arc 60. The gas delivery assembly 500 can also be referred to as a gas assembly 500. |
| 510 | Gas | A non-solid, non-liquid and non-ionized material supplied to the torch assembly 200. |
| 512 | Plasma Gas | A gas 510 that will become ionized to create and sustain the plasma arc 60. An example of a suitable plasma gas 512 is Ar—H2 65/35, but other plasma gasses 512 known in the prior art can be used by the system 100. In some instances, the secondary gas 518 can be used as the plasma gas 512. |
| 516 | Ionized Plasma Gas | Plasma gas 512 in a sufficiently heated, ionized, and in a high velocity state (often supersonic) that it is suitable for atomizing the material in the free end 370 of the wire 310. |

TABLE 1-continued

| Element Number | Element Name | Element Definition/Descriptions |
|---|---|---|
| 518 | Secondary Gas | A gas 510 that is used to direct the particle stream 70 originating from the free end 370 the wire 310 in the desired direction. The secondary gas 518 can in some embodiments be used as the plasma gas 512. A secondary gas 518 is typically introduced into the gas manifold 550. The flow of the secondary gas 518 is typically higher that the flow of the plasma gas 512. Secondary gas 518 is used to further atomize and accelerate the particles 70. A common example of a secondary gas 518 is air, but there are many different secondary gases 518 known in the prior art that can be utilized by the system 100. |
| 520 | Gas Source | A subassembly or component that supplies one or more gases 510 to the system 100 or apparatus 110. |
| 522 | Primary Gas Source/Plasma Gas Source | The gas source 520 for plasma gas 512. |
| 524 | Secondary Gas Source | The gas source 520 for secondary gas 518. |
| 530 | Gas Port | A passageway through which gas 510 can travel and is directed to travel from one location within the system 100 to another location. A common example of a gas port 530 is an opening in the cathode holder 214 or torch body 202 through which gas 510 exits. The gas port 530 allows for the delivery of gas 510 to the cathode 212. Gas 510 travelling to the cathode 212 through the gas port 530 is an important input for the creation of the plasma arc 60. |
| 532 | Plasma Gas Port | A port 530 that provides for the delivery of plasma gas 512 to the cathode holder 214. |
| 534 | Secondary Gas Port | A port 530 that provides for the delivery of secondary gas 518 to the gas manifold 550. |
| 536 | Insulator Block Gas Port | A port 530 within the insulator block 434 that provides for a small amount of secondary gas 518 to be directed through the insulator block 424 to facilitate the removal of heat from the insulator block 434. |
| 540 | Passageway | A passageway in the system 100 through which the secondary gas 518 passes through the system 100 to reach the particle stream 70 that is directing the secondary gas 518. A passageway 540 can exist within a nozzle 220 (a nozzle passageway 240) or outside the nozzle 220. A bore 556 is an example of a passageway 540 that exists outside the nozzle 220. |
| 541 | Passageway Size or Size | A quantitative metric, such as distance, area, or volume that describes the magnitude of the passageway 540. Some embodiments of the system 100 may utilize differences in passageway sizes 541 to create a non-symmetrical passageway configuration 549. |
| 542 | Passageway Shape or Shape | Geometric information about a passageway 540 that remains when location, scale, orientation, and reflection are removed. Some embodiments of the system 100 may utilize differences in passageway shapes 542 to create a non-symmetrical passageway configuration 549. |
| 543 | Passageway Angle or Angle | The angle at which a passageway 540 directs secondary gas 518 to the particle stream 70. Some embodiments of the system 100 may utilize differences in passageway angles 543 to create a |

TABLE 1-continued

| Element Number | Element Name | Element Definition/Descriptions |
|---|---|---|
| | | non-symmetrical passageway configuration 549. The angle 543 is measured relative to the center vector 78. |
| 544 | Passageway Location or Location | A position of a passageway 540. Some embodiments of the system 100 may utilize differences the layout of passageway locations 544 to create a non-symmetrical passageway configuration 549. Symmetrical locations 544 are evenly spaced around a hypothetical center point. |
| 545 | Passageway Inlet or Inlet | An entry opening into a passageway 540. In many embodiments, each passageway 540 will have only one inlet 545, but it is possible for a single passageway 540 to have 2 or more inlets 545. |
| 549 | Non-Symmetrical Configuration | A configuration of passageways 540 that causes the particle stream 70 to be a deflected particle stream 90. The absence of symmetry can be achieved in a variety of different ways, such as through a difference in passageway size 541, passageway shape 542, passageway angle 543, and/or through a non-symmetrical arrangement of passageway locations 544 (such as non-symmetrical passageway locations 544 or symmetrical locations 544 with one or more locations devoid of passageways 540). |
| 550 | Gas Manifold | A cavity or chamber formed between a secondary gas director 576 and the torch body 202. The gas manifold 550 can also be referred to as a first manifold 550. |
| 554 | Second Manifold | A cavity or chamber that secondary gas 518 is directed to after the initial gas manifold 550. Secondary gas 518 moves from the first manifold 550 to the second manifold 54 through bores 556 connecting the two chambers. |
| 556 | Bores | A passageway 540 that is positioned outside the nozzle 220. |
| 570 | Gas Director | A device that directs the flow of a gas 510 in the system 100. A gas director 570 is a type of gas port 530 but not every gas port 530 is a gas director 570. A gas director 570 does more than provide a passageway for the movement of gas 510. A gas director 570 distributes gas 510. A gas director 570 is analogous to a sprinkler head that distributes water on a lawn. In contrast, a gas port 530 that is not a gas director 570 is analogous to a mere pipe through which water is merely transported. A gas director 570 shapes the distribution of the respective gas 510 to facilitate the conditions for an effective plasma arc 60. Examples of gas directors 570 can include but are not limited to plasma gas directors 571 and secondary gas directors 576. There are a variety of different gas directors 570 and resulting gas flows that are known in the prior art. The system 100 can be implemented using any of such gas directors 570 and flows. |
| 571 | Plasma Gas Director | A gas director 570 that directs plasma gas 512 towards the cathode 212. Examples of plasma gas directors 571 can include but are not limited to swirl rings 574, laminar tubes 573, and turbulent openings 572. |

TABLE 1-continued

| Element Number | Element Name | Element Definition/Descriptions |
|---|---|---|
| 572 | Turbulent Opening | An example of a plasma gas director 571 that is not swirl-based. The plasma gas 512 in a turbulent opening 572 involves a velocity that fluctuates irregularly through the result of continual mixing. |
| 573 | Laminar Tube | An example of a plasma gas director 571 that is not swirl-based. The plasma gas 512 in laminar tube 573 involves plasma gas 512 that moves at the same velocity entering the tube 573 as it does leaving the tube 573. A cartridge 560 can include multiple laminar tubes 573 used to arrange the delivery of plasma gas 512 to the cathode 212. |
| 574 | Swirl Ring | An example of a plasma gas director 571 that directs the plasma gas 512 in a swirling motion towards the cathode 212. The system 100 can include one or more swirl rings 574 configured in various positions around the cathode 212. There are numerous swirl rings 574 known in the prior art. |
| 576 | Secondary Gas Director | A gas director 570 used to direct a secondary gas 518 towards the particle stream 70. The most common example of a secondary gas director 576 is an air baffle 578. |
| 578 | Air Baffle Or Baffle Plate | An example of a secondary gas director 576. |
| 590 | Plasma Chamber | The area around the cathode 212 where plasma gas 512 is ionized to form the arc 60. |
| 600 | Sensor Assembly | An optional assembly within the system 100 that can be used to capture sensor readings that relate to operations of the system. For example, electrical measurements captured by sensors can be used to identify certain undesirable conditions before the symptoms of those conditions are readily ascertained by human observers. Please see the patent application titled "SYSTEM, APPARATUS, AND METHOD FOR MONITORED THERMAL SPRAYING" (Serial Number 15/191,497 that was filed on Jun. 23, 2016), the contents of which are hereby incorporated by reference in their entirety. |
| 700 | IT Assembly | An optional assembly within the system 100 that can be used process information captured by the sensor assembly 600. Such an assembly can proactively identify undesirable operating conditions at an early stage so that they can be corrected. |
| 900 | Method | A process of steps for detecting out of tolerance operating conditions 800 in the thermal spray process and selectively generating a response 770. |

II. OVERVIEW

The system 100 can be implemented and used with respect to virtually any prior art PTWA apparatus 50. Implementation of the system 100 involves will often involve use of a nozzle 220 that includes a non-symmetrical nozzle passageway configuration 249. However, other components of the system 100 such as an air baffle 578 or some other secondary gas director 576 can be implemented to possess the structural attributes effectuating the non-symmetrical passageway configuration 549.

The non-symmetrical nature of a non-symmetrical passageway configuration 549 can be grounded in a variety of different attribute configurations. By way of example, such a configuration can result from even one of the following attributes:

1. Two or more passageways 540 are of a different size 541.
2. Two or more passageways 540 are of a different shape 542.
3. Two or more passageways 540 are positioned at different angles 543 relative to a center vector.
4. At least one passageway 540 is omitted at a symmetrical location 544.
5. At least one passageway 540 is positioned a non-symmetrical location 544

The deflection of particle stream 70 can also be influenced by other factors acting in concert with a non-symmetrical passageway configuration 549, such as the pressure, quantity, temperature, and density of the secondary gas 518.

Whether the source of non-symmetry resides within the nozzle 220, outside the nozzle 220, or both within and outside of the nozzle 220, such a non-symmetrical configuration 549 can be implemented to deflect the particle stream 70 horizontally 91 and/or vertically 92. Horizontal deflection 91 in the direction that is opposite to the rotational movement 280 of the cathode 212 as it rotates around the wire 310 can be particularly desirable, but horizontal deflection 91 with the direction in which the cathode 212 rotates around the wire 312 may desirable in certain contexts.

Secondary gas 518 (typically air, but other secondary gases 518 are known in the prior art) is directed towards the particle stream 70 to shape and direct the particle stream The particle stream 70 is created by the plasma arc 70 across a gap 61 between the cathode 212 and the free end 370 of the wire 310. In the prior art, the secondary gas 518 is directed in a symmetrical manner towards to the particle stream 70. This results in a particle stream 70 that is highly symmetrical and collimated. The spray pattern in such a particle stream 70 can be relatively narrower in comparison to the spray pattern resulting from a non-symmetrical passageway configuration 549.

Particle streams 70 that are not deflected have a center line 76 that is horizontally perpendicular to the free end of the wire 370 and in line with the center vector 78. Such a center line 76 protrudes mostly straight out from the plasma arc 60, from the center point in the opening 224 of the nozzle 220 along the center vector 78. A particle stream that is deflected can be referred to as a deflected particle stream 90.

Deflection can occur in a vertical up/down direction (which is referred to as vertical deflection 92), a horizontal left/right direction (which is referred to as horizontal deflection 91), or in both directions simultaneously. It is believed that horizontal deflection 91 is particularly useful, and the horizontal deflection 91 is against the direction of at which a cathode 212 rotates around the free end 370 of the wire 310 is potentially more useful than horizontal deflection 91 that is in the same direction in which the cathode 212 rotates.

A deflected particle stream 90 differs in several respects from a non-deflected particle stream 70. A deflected particle stream 90 increases the porosity of the coating on the surface 80 being sprayed. Such a particle stream 90 is less collimated, with a wider and non-symmetrical spay pattern. Also, by creating a less collimated spray pattern there is less localized heating of the surface 80. Not all of the particles in the particle stream 90 will adhere to the surface 80. Particles that do not adhere will be deflected and/or splash off the surface 80. With a deflected particle stream 90 these particles not adhering to the surface 80 are less likely to build up on the face of the nozzle 220. In addition, by performing horizontal deflection 91 as opposed to vertical deflection 92, there will be less buildup of these particles not adhering to the surface on the torch body 202 above the nozzle 220.

Figure 1B:
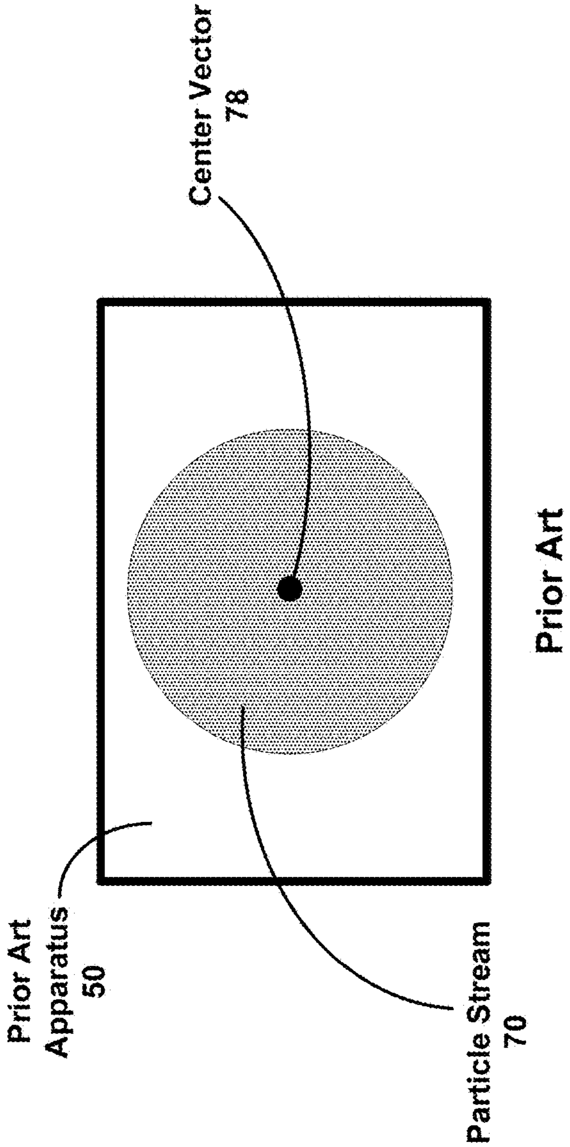
Prior Art Figure 1b
FIG. 1*b* is a block diagram illustrating the example of FIG. 1*a*, but from a different orientation/point of view. The particle stream in FIG. 1*a* is not deflected.

FIG. 1*a* is block diagram illustrating an example of a particle stream 70 that is created using a prior art PTWA system 50 in which secondary gas 518 is directed to the particle stream 70 in a symmetrical manner. FIG. 1*b* is a block diagram illustrating the example of FIG. 1*a*, but from a different orientation/point of view. For example, if FIG. 1*a* is taken as a top view, then FIG. 1*b* is a view from looking down the centerline of the opening 224 in the nozzle 220. If FIG. 1*a* is a side view, then FIG. 1*b* is a view from looking at the centerline of the opening 224 in the nozzle 220.

Figures 2A, 2B:
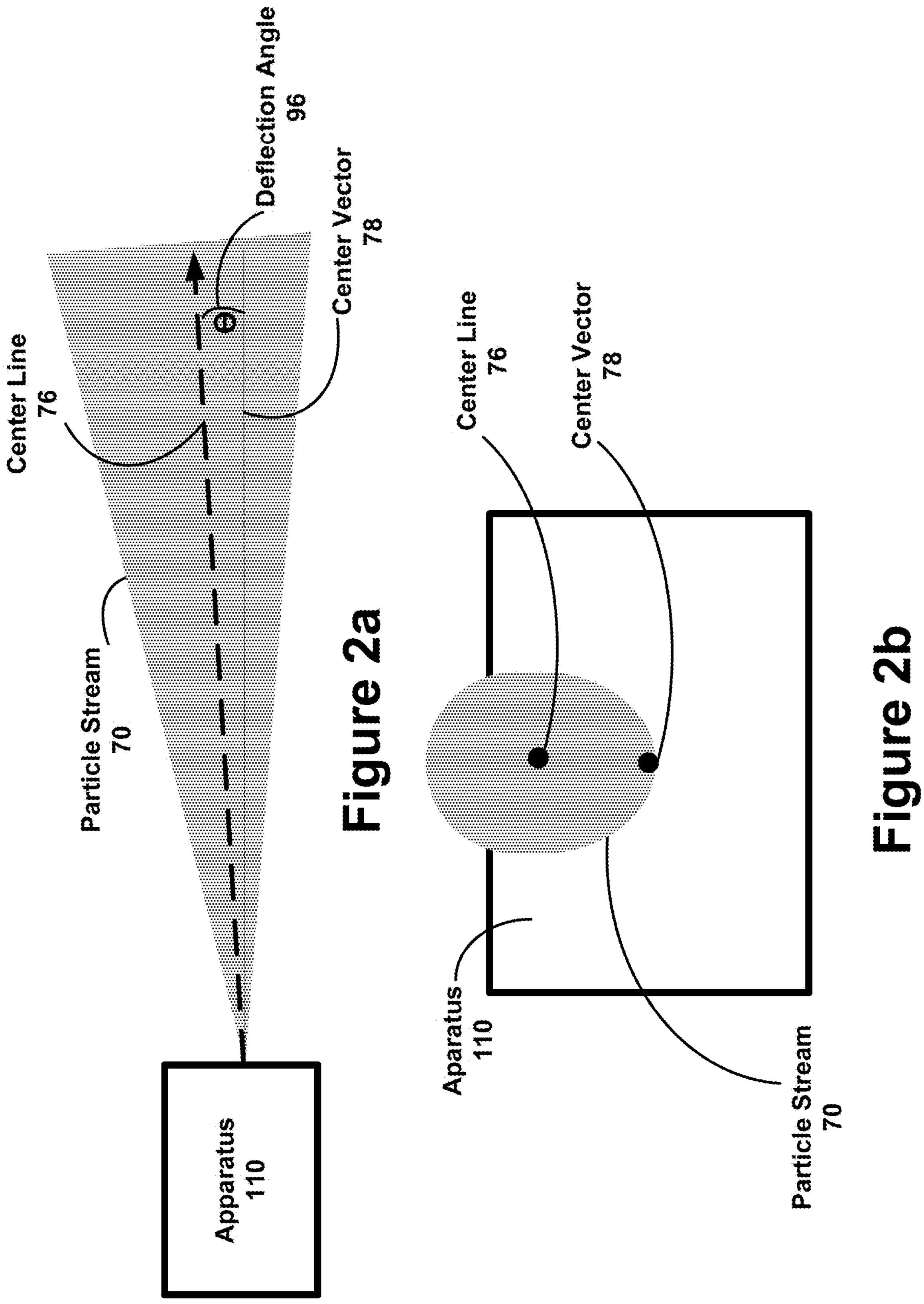
FIG. 2*a* is a block diagram illustrating an example of a particle stream that is being deflected. As a block diagram.
FIG. 2*b* is a block diagram that illustrates the example of FIG. 2*b*, but from a different orientation/point of view.

FIG. 2*a* is a block diagram illustrating an example of a particle stream 70 that is being deflected. As a block diagram, the illustration of FIG. 2*a* is capable of illustrating an example of horizontal deflection 91 (deflection in a right/left direction) in the context of a top view or vertical deflection 92 (deflection in an up/down direction) in the context of a side view. FIG. 2*a* serves as a direct contrast to a non-deflected particle stream in FIG. 1*a*. FIG. 2*b* is a block diagram that illustrates the example of FIG. 2*a*, but from a different orientation/point of view. Vertical deflection 92 is illustrated if FIG. 2*a* is taken as a side view, while horizontal deflection 91 is illustrated if FIG. 2*a* is taken as a top view. FIG. 2*b* is a similar view to FIG. 1*b*, except that in FIG. 1*b* there is no deflection and in FIG. 2*b* there is deflection.

In the context of horizontal deflection, the deflection angle 79 is an angle in the left/right plane. The deflection angle 79 can be less than 5 degrees, up to 10 degrees, in excess of 10 degrees, or even in excess of 20 degrees depending on the specific nature of the material making up the surface 80 to be treated with the particle stream 70.

In the context of vertical deflection, the deflection angle 79 is an angle in the up/down plane. The deflection angle 79 can be less than about 5 degrees, up to about 10 degrees, in excess of about 10 degrees, or even in excess of about 20 degrees depending on the specific nature of the material making up the surface 80 to be treated with the particle stream 70.

III. NON-SYMMETRICAL PASSAGEWAY CONFIGURATION

The system 100 can implement non-symmetrical passageway configuration 549 that includes one or more passageways 540 in a variety of different ways. In many embodiments, the non-symmetrical passageway configuration 549 is a non-symmetrical nozzle passageway configuration 249, but the non-symmetry can also be based on the structure of the secondary gas director 576, such as an air baffle 578.

Attributes of the nozzle 220 and/or secondary gas director 576 can result in a deflected particle stream 90 without changing the orientation of the nozzle 220 or the orientation of the wire 310 that is used to form the plasma arc 60.

Figure 3A:
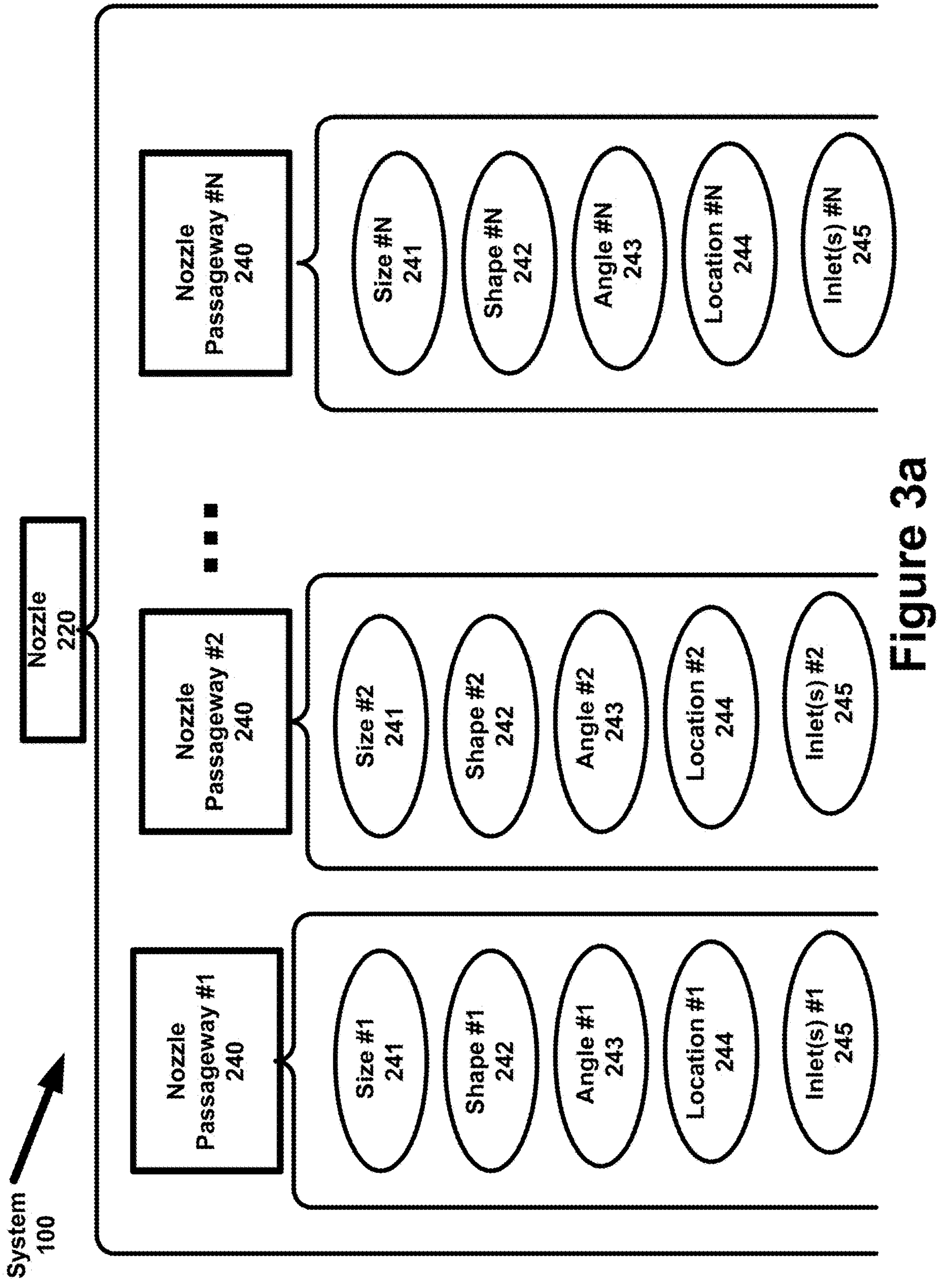
FIG. 3*a* is a block diagram illustrating that a nozzle can include one or more nozzle passageways, with each nozzle passageway possessing various attributes such as size, shape, angle, location, and the number of inlets that direct air through the passageway. The non-symmetrical nozzle passageway configuration can be achieved by differentiating one or more such attributes within the passageway configuration.

Any non-symmetrical passageway configuration 549 of one or more passageways 540 in the system 100 can potentially result in the directing of secondary gas 518 in a non-symmetrical manner such that the particle stream 70 is a deflected particle stream A. Passageway Attributes FIG. 3*a* is a block diagram illustrating that a nozzle 220 can include one or more nozzle passageways 240, with each nozzle passageway 240 possessing various attributes such as size 241, shape 242, angle 243, location 244, and the number of inlets 245 that direct secondary gas 518 through the nozzle passageway 240. The non-symmetrical nozzle passageway configuration 249 can be achieved by differentiating one or more such attributes within the nozzle passageway configuration 249. By way of example, the different nozzle passageways 240 can be identical in all respects except for size 241 and the resulting configuration 249 is non-symmetrical causing the resulting particle stream 70 to be a deflected particle stream 90. Differentiation is only required with respect to one attribute is required for a non-symmetrical nozzle passageway configuration 249, but multiple types of nozzle passageway 240 attributes can be used simultaneously to trigger the desired deflection in the particle stream 70.

Figure 3B:
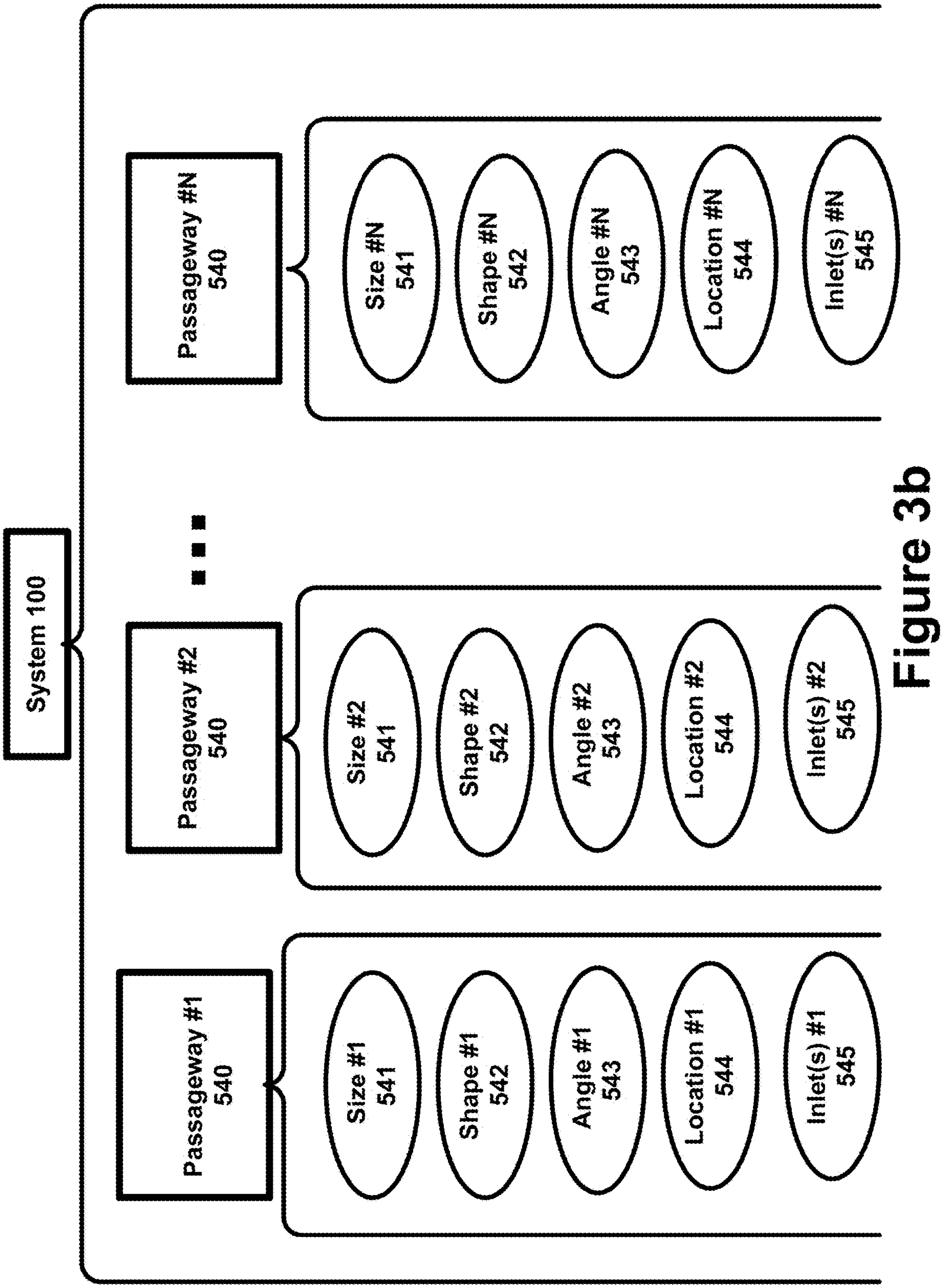
FIG. 3*b* is a block diagram illustrating that a system can include one or more passageways, with each passageway possessing various attributes such as size, shape, angle, location, and the number of inlets that direct air through the passageway. The non-symmetrical passageway configuration can be achieved by differentiating one or more such attributes within the passageway configuration.

FIG. 3*b* is a similar but more generalized block diagram compared to FIG. 3*a*, with FIG. 3*b* illustrating that the non-symmetrical nature of the non-symmetrical passageway can exist outside the nozzle 220 and elsewhere in the system 100. A system 100 can include one or more passageways 540, with each passageway 540 possessing various attributes such as size 541, shape 542, angle 543, location 544, and the number of inlets 545 that direct secondary gas 518 through the passageway 540. The non-symmetrical passageway configuration 549 can be achieved by differentiating one or more such attributes within the passageway configuration. By way of example, the different passageways 549 can be identical in all respects except for size 541 and the resulting configuration 549 is non-symmetrical causing the resulting particle stream 70 to be a deflected particle stream 90. Differentiation is only required with respect to one attribute is required for a non-symmetrical passageway configuration 549, but multiple types of passageway 540 attributes can be used simultaneously to trigger the desired deflection in the particle stream 70.

B. Prior Art

Figure 3C:
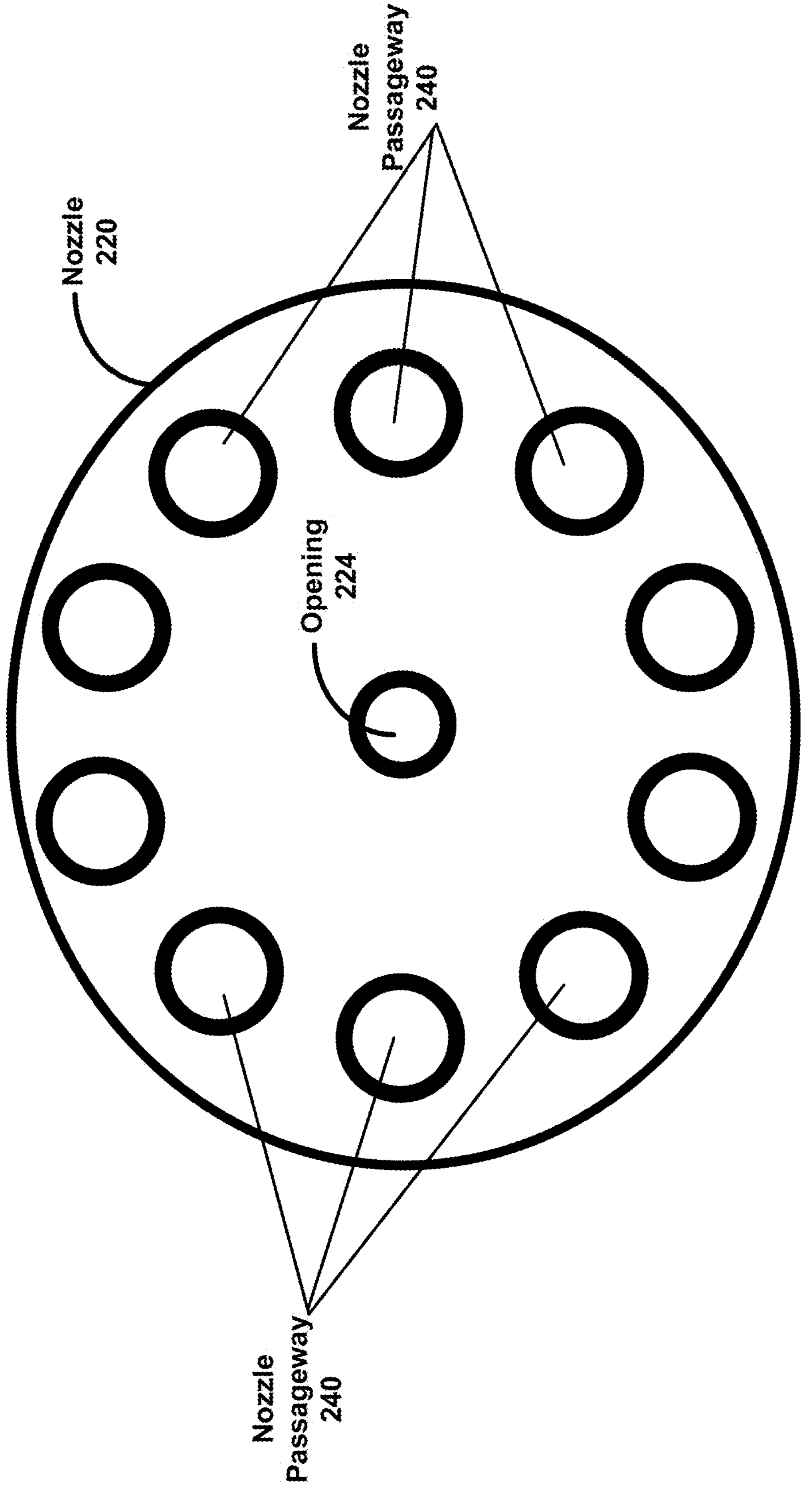
Prior Art Figure 3c
FIG. 3*c* is a face view diagram illustrating an example of a prior art nozzle with a symmetrical nozzle passageway configuration. The nozzle passageways are identical in shape, size, and angle, and the nozzle passageways are positioned in symmetrical locations.

FIG. 3*c* is a face view diagram illustrating an example of a nozzle 220 in the prior art where the configuration of nozzle passageways 240 are symmetrical. Such a configuration of nozzle passageways 240 will result in a particle stream 70 that is not deflected.

Figure 3D:
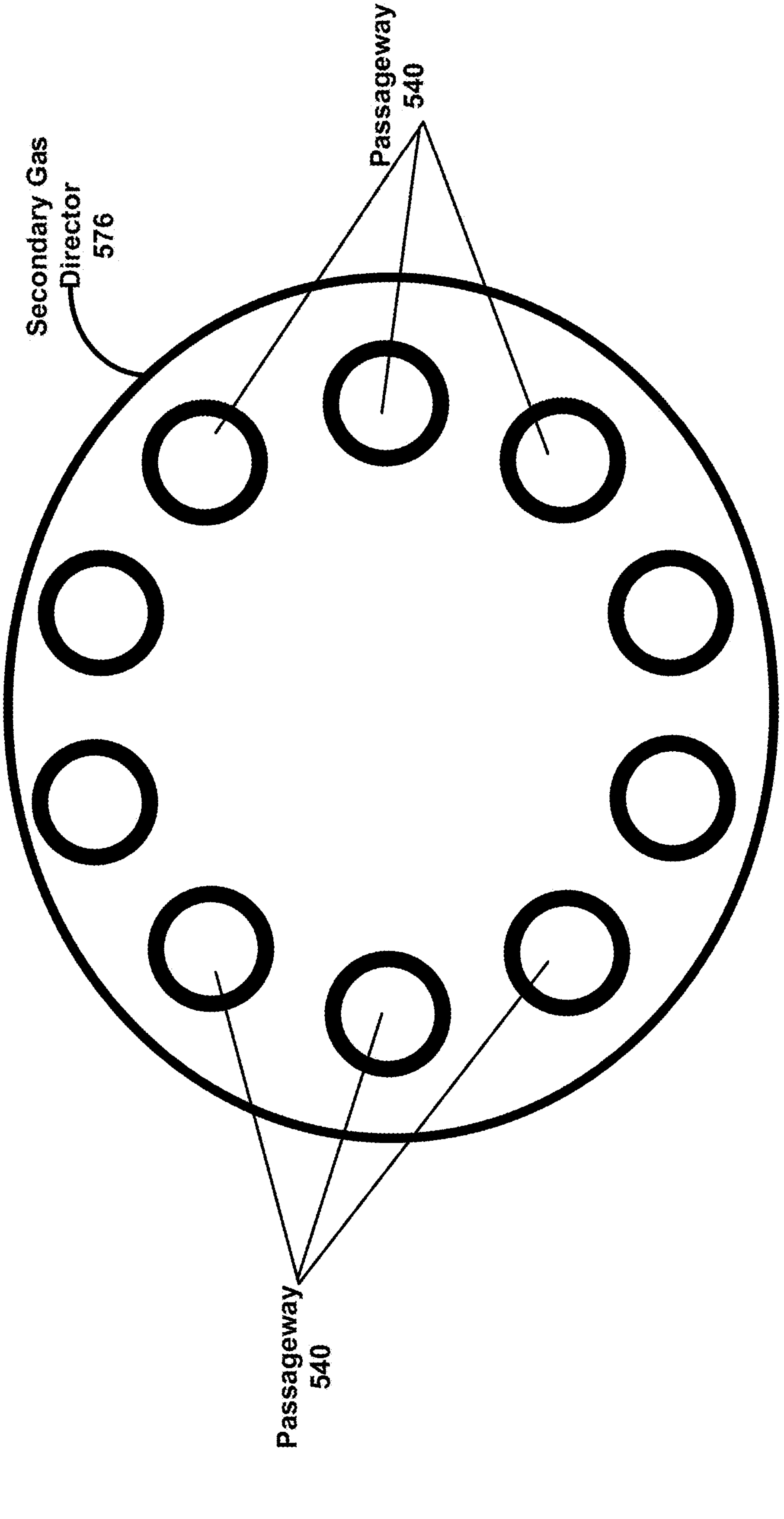
Prior Art Figure 3d
FIG. 3*d* is a face view diagram illustrating an example of a prior art secondary gas director with a symmetrical passageway configuration.

FIG. 3*d* is face view diagram illustrating an example of a prior art secondary gas director 576 with passageways 540 in a symmetrical configuration. Such a configuration of passageways 540 will result in a particle stream 70 that is not deflected.

C. Size

Figure 3E:
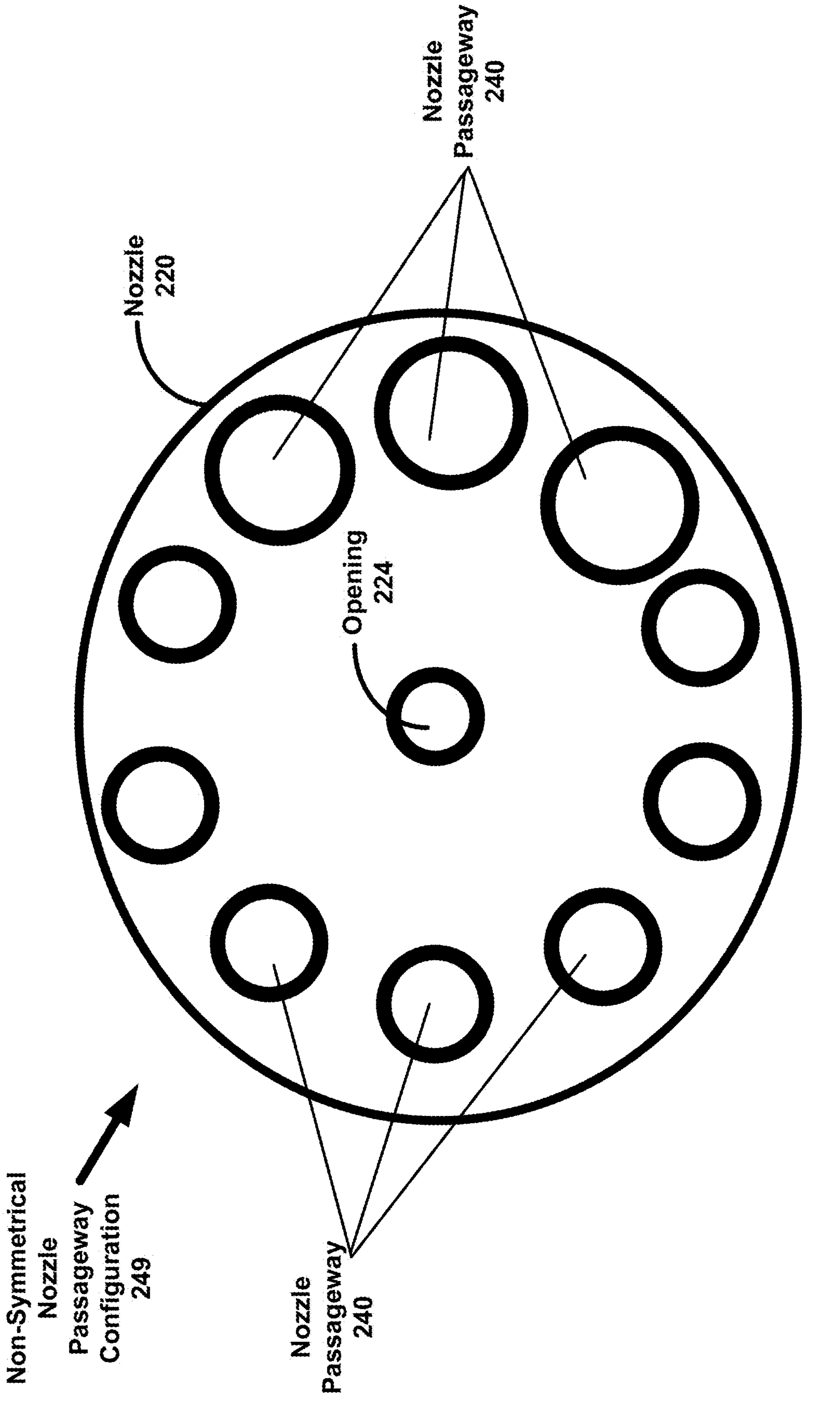
FIG. 3*e* is a face view diagram illustrating an example of a nozzle with a non-symmetrical nozzle passageway configuration in which the sizes of the nozzle passageways are different. Three of the nozzle passageways on the right side of the nozzle are larger than the other nozzle passageways.

FIG. 3*e* is a face view diagram illustrating an example of a nozzle 220 with a non-symmetrical nozzle passageway configuration 249 in which the sizes 241 of the nozzle passageways 240 are different. More specifically, the three nozzle passageways 240 on the right side of the diagram are larger than the other nozzle passageways 240 in the figure. The nozzle passageway attributes of shape 242 and angle 243 are identical, and the locations 244 are symmetrical, yet the differences in size 241 result in a non-symmetrical nozzle passageway configuration 249.

Figure 3F:
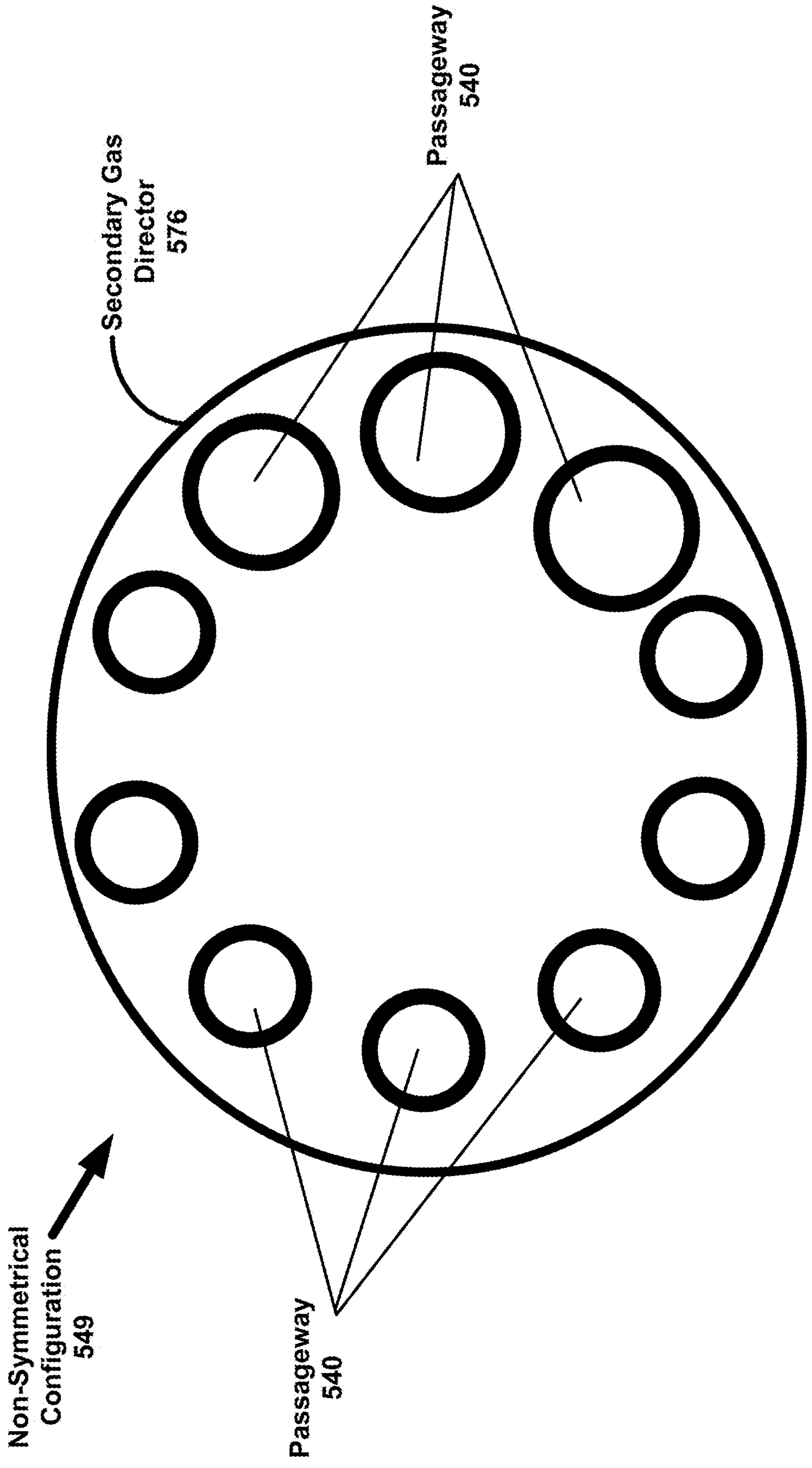
FIG. 3*f* is a face view diagram illustrating an example of a secondary gas director with a non-symmetrical nozzle passageway configuration in which the sizes of the passageways are different.

FIG. 3*f* is a face view diagram illustrating an example of a secondary gas director 576 with a non-symmetrical passageway configuration 549 in which the sizes 541 of the passageways 540 are different. More specifically, the three passageways 540 on the right side of the diagram are larger than the other passageways 540 in the figure. The passageway attributes of shape 542 and angle 543 are identical, and the locations 544 are identical, yet the differences in size 541 result in a non-symmetrical passageway configuration 549.

D. Shape

Figure 3G:
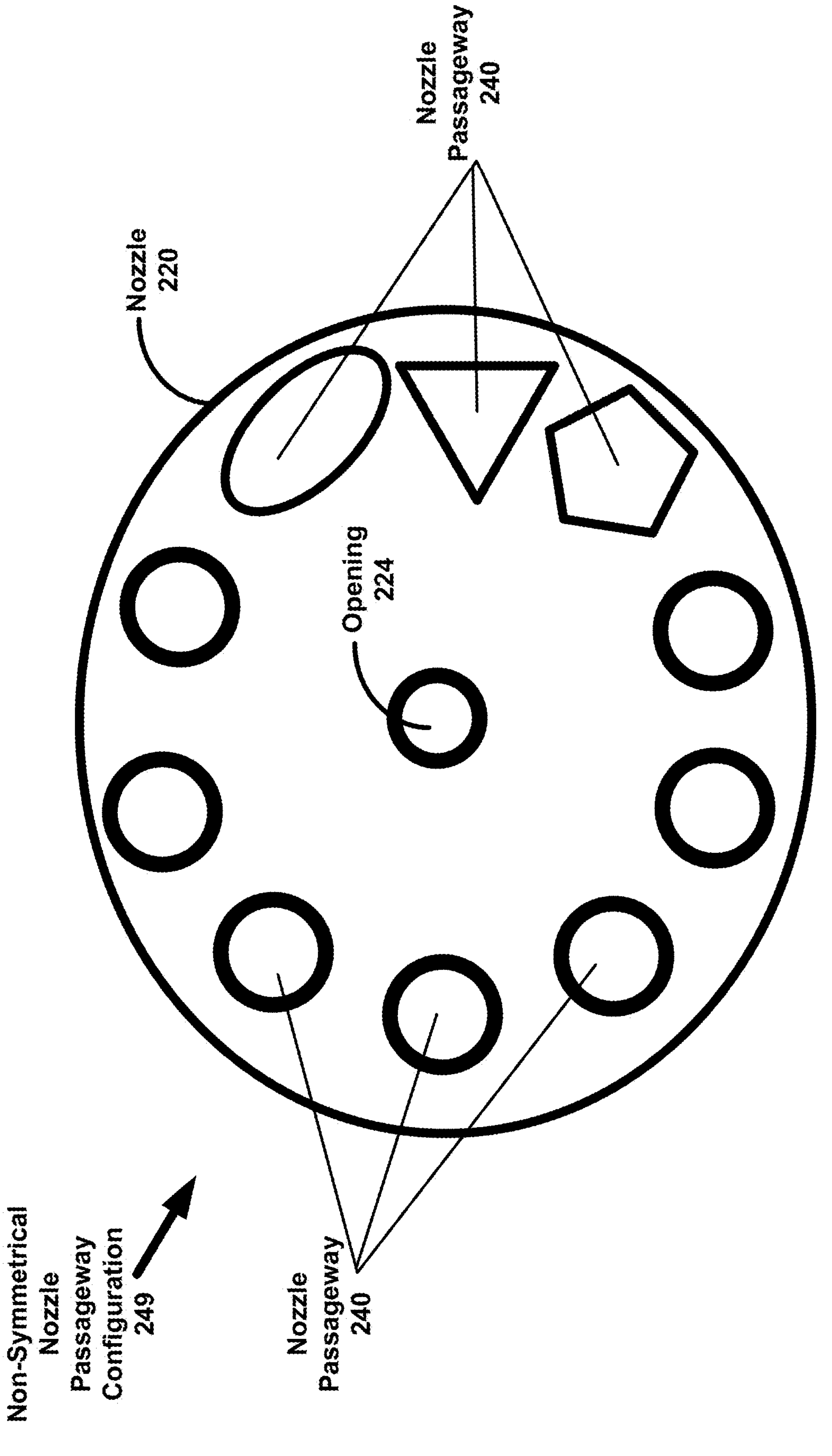
FIG. 3*g* is a face view diagram illustrating an example of a nozzle with a non-symmetrical nozzle passageway configuration in which the shapes of the nozzle passageways are different.

FIG. 3*g* is a face view diagram illustrating an example of a nozzle 220 with a non-symmetrical nozzle passageway configuration 249 in which the shapes 242 of the nozzle passageways 240 are different. The nozzle passageway attributes of size 241 and angle 243 are identical, and the locations 244 are symmetrical, yet the differences in shape 242 result in a non-symmetrical nozzle passageway configuration 249.

Figure 3H:
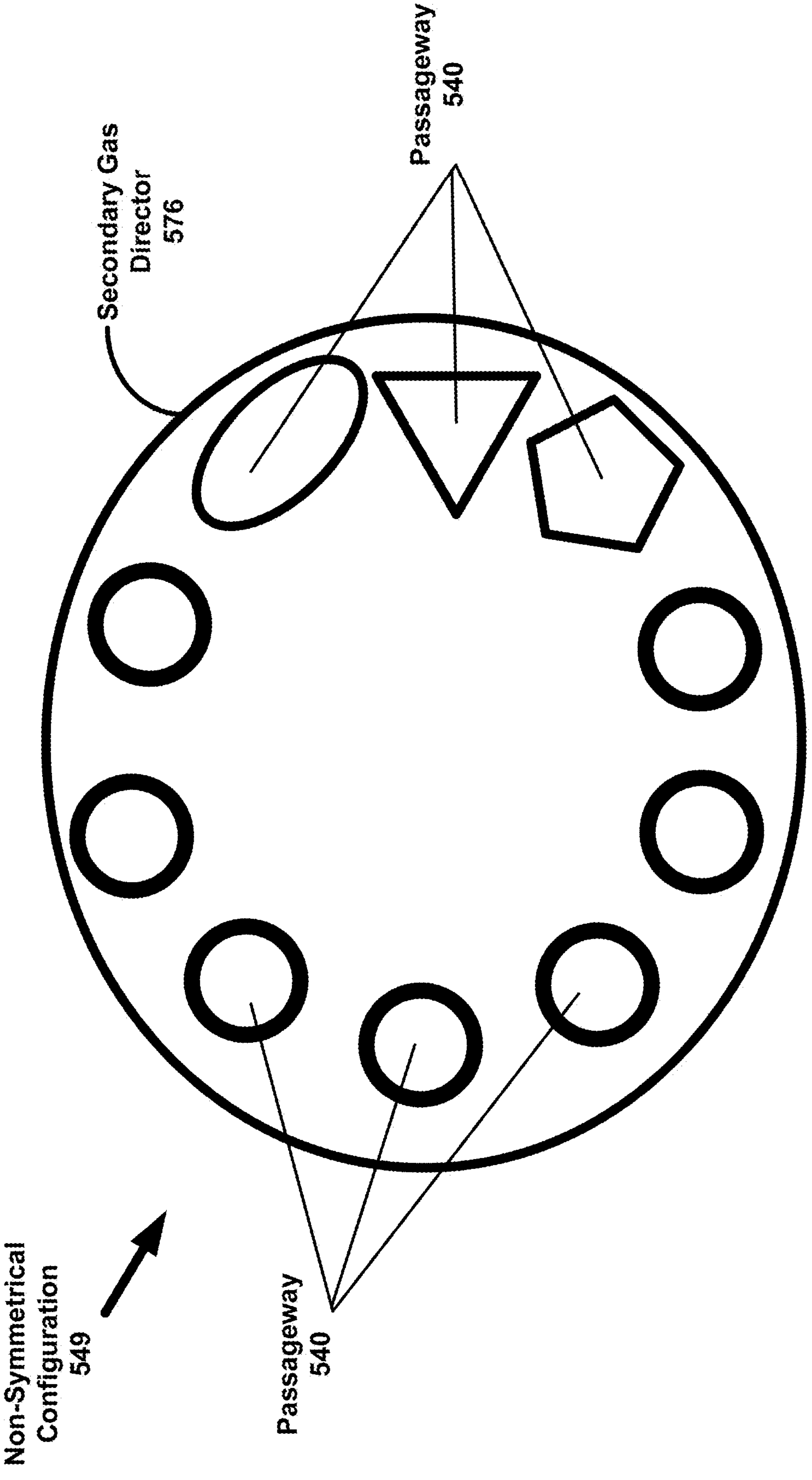
FIG. 3*h* is a face view diagram illustrating an example of a secondary gas director with a non-symmetrical passageway configuration in the shapes of passageways are different.

FIG. 3*h* is a face view diagram illustrating an example of a secondary gas director 576 with a non-symmetrical passageway configuration 549 in which the shapes 542 of the passageways 540 are different. The passageway attributes of size 541 and angle 543 are identical, and the locations 544 are symmetrical, yet the differences in shape 542 result in a non-symmetrical passageway configuration 549.

E. Angle

Figure 3I:
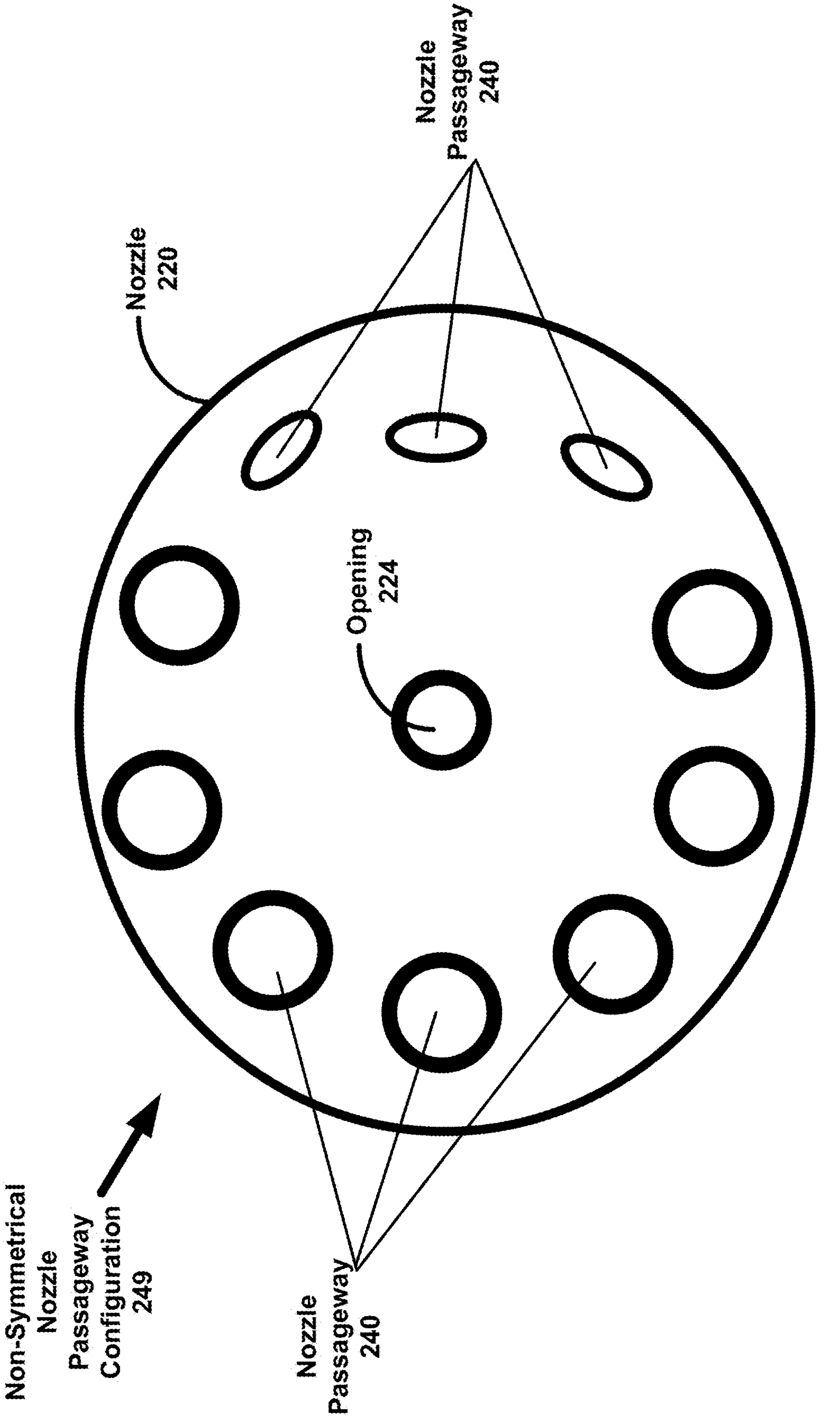
FIG. 3*i* is a face view diagram illustrating an example of nozzle with a non-symmetrical nozzle passageway configuration in which the angles of the nozzle passageways are different.

FIG. 3*i* is a face view diagram illustrating an example of a nozzle 220 with a non-sym metrical nozzle passageway configuration 249 in which the angles 243 of the nozzle passageways 240 are different. The nozzle passageway attributes of size 241, and shape 242 are identical, and the locations 244 are symmetrical, yet differences in the angles 243 result in a non-symmetrical nozzle passageway configuration 249.

Figure 3J:
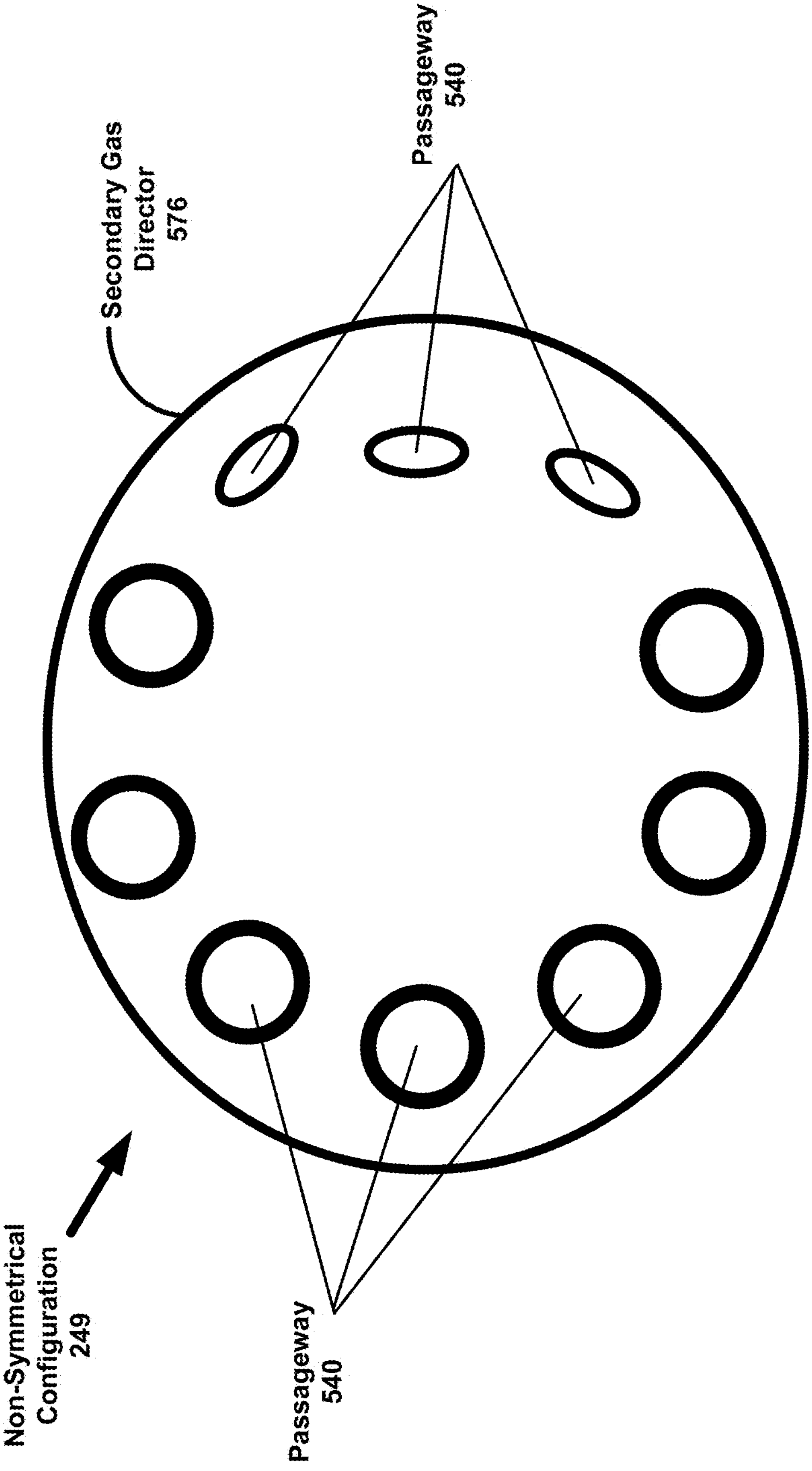
FIG. 3*j* is a face view diagram illustrating an example of a secondary gas director with a non-symmetrical passageway configuration in the angles of passageways are different.

FIG. 3*j* is a face view diagram illustrating an example of a secondary gas director 576 with a non-symmetrical passageway configuration 549 in which the angles 543 of passageways 540 are different. The passageway attributes of size 541 and shape 542 are identical, and the locations 544 are symmetrical, yet differences in the angles 543 result in a non-symmetrical passageway configuration 549.

Figure 3K:
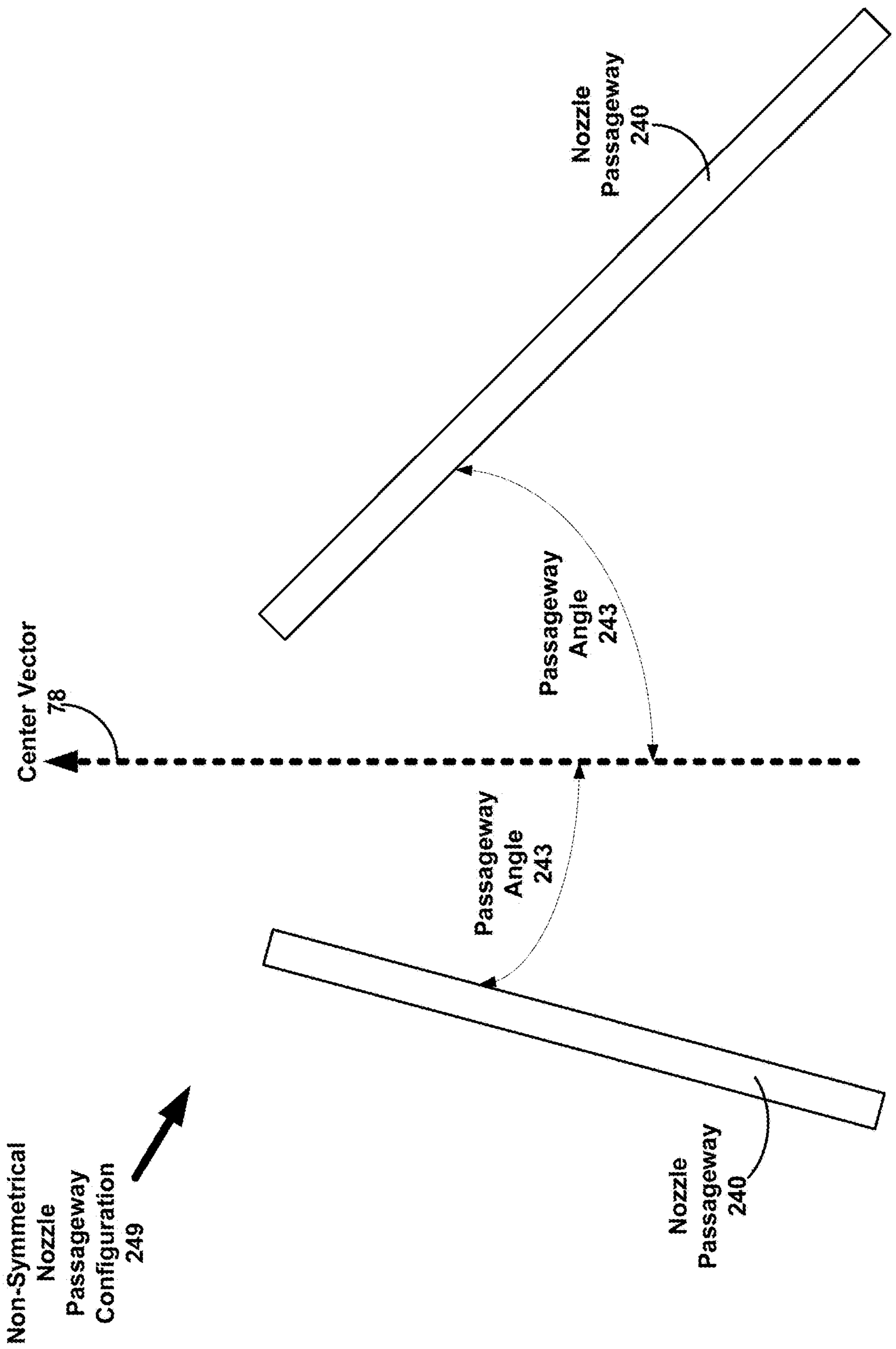
FIG. 3*k* is cross sectional side view diagram illustrating an example of nozzle with a non-symmetrical nozzle passageway configuration in which the angles of the nozzle passageways are different.
Figure 3I:
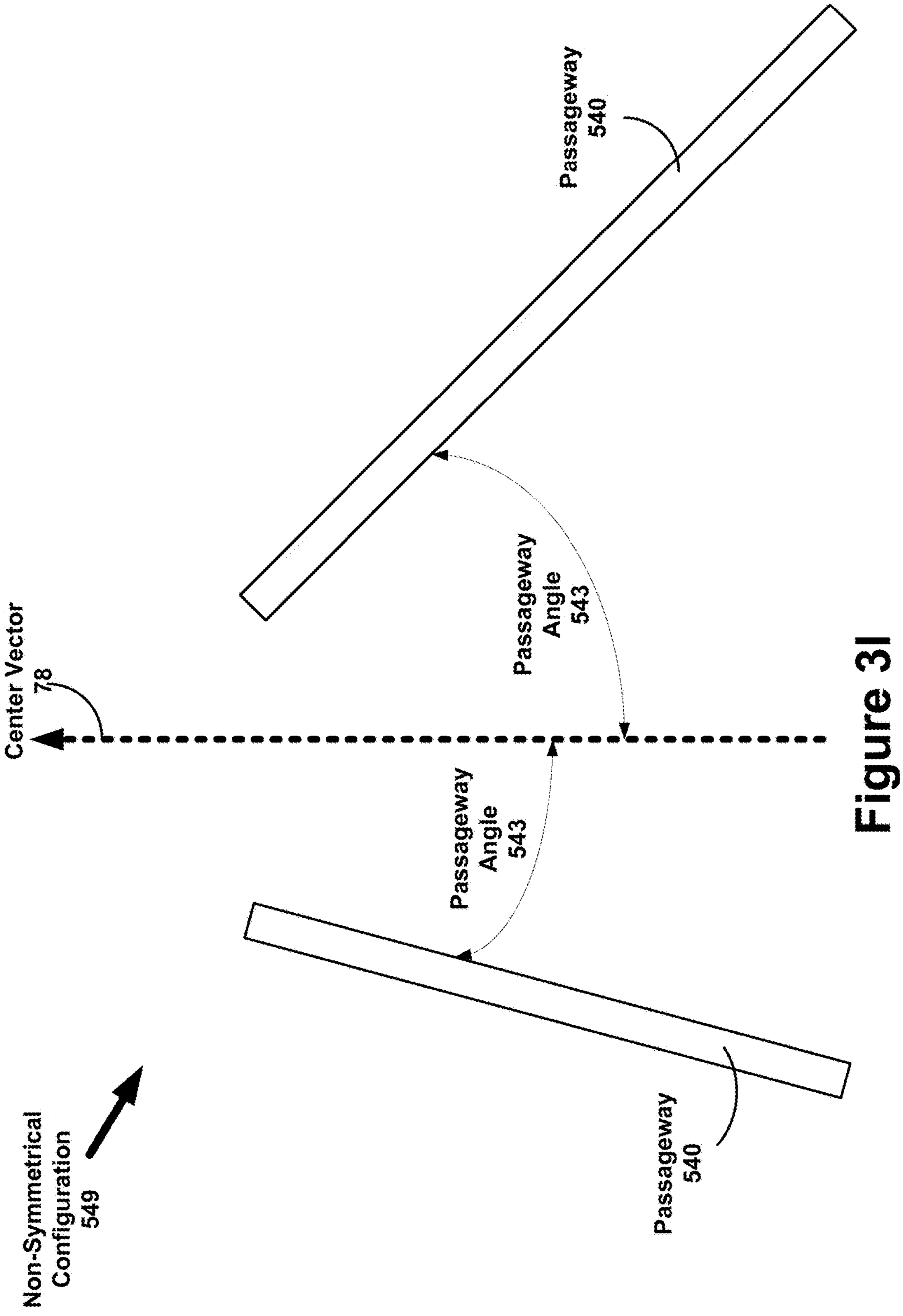

FIG. 3*k* is cross sectional side view diagram illustrating an illustrating an example of nozzle 220 with a non-symmetrical nozzle passageway configuration 249 in which the angles 243 of the nozzle passageways 240 are different.

FIG. 3*l* is a cross sectional side view diagram illustrating an example of a secondary gas director 576 with a non-symmetrical passageway configuration 549 in the angles 543 of passageways 540 are different.

F. Locations

Non-symmetry in locations 544 can be achieved through the omission of one or more passageways 540 in an otherwise symmetrical configuration or by having at least one passageway 540 at a non-symmetrical location 544.

1. Omission

Figure 3M:
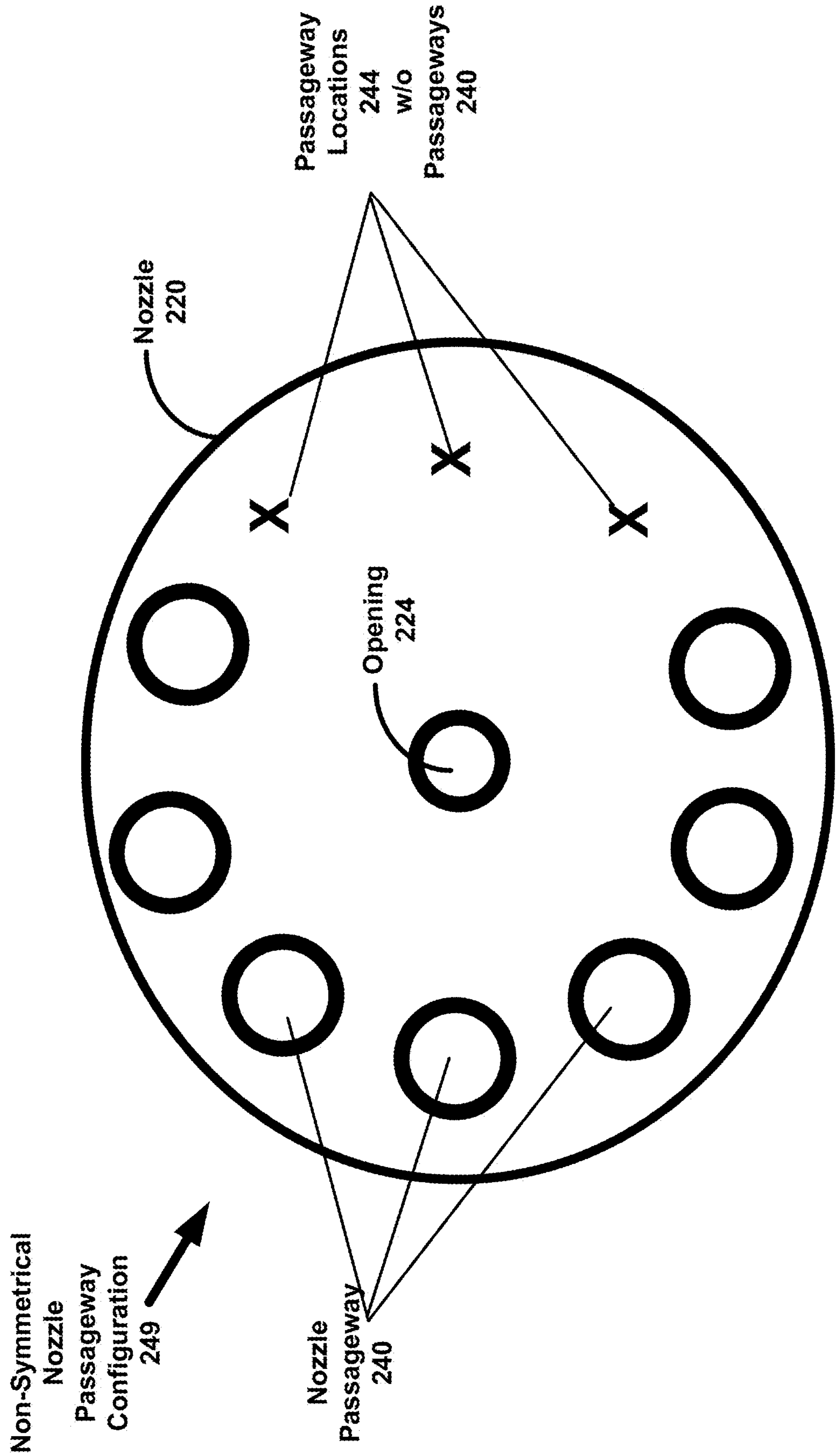
FIG. 3*m* is a face view diagram illustrating an example of a nozzle with a non-symmetrical nozzle passageway configuration in which the non-symmetrical nozzle passageway configuration results from the omission of nozzle passageways at certain otherwise symmetrical locations.

FIG. 3*m* is a face view diagram illustrating an example of a nozzle 220 with a non-symmetrical nozzle passageway configuration 249 in which the non-symmetrical nozzle passageway 249 configuration results from the omission of nozzle passageways 240 at certain otherwise symmetrical locations 244. The various nozzle passageways attributes of size 241, shape 242, and angle 243 are identical. In FIG. 3*m*, there are three adjacent vacant locations 244, but any combination of one or more vacant locations 244 can be used to trigger the non-symmetrical flow of air 518 to deflect the particle stream 70.

Figure 3N:
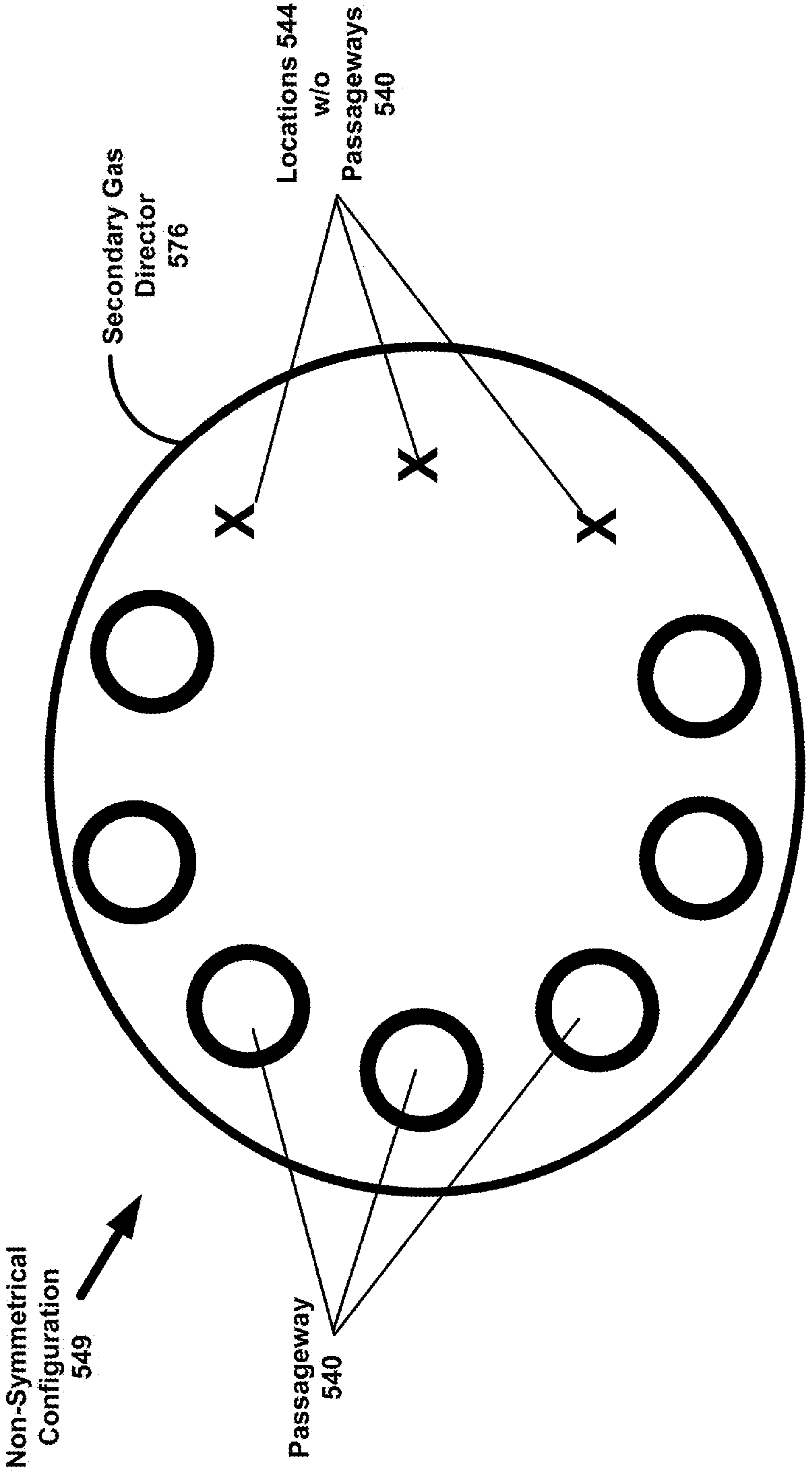
FIG. 3*n* is a face view diagram illustrating an example of a secondary gas director with a non-symmetrical passageway configuration in which the non-symmetrical passageway configuration results from the omission of passageways at certain otherwise symmetrical locations.

FIG. 3*n* is a face view diagram illustrating an example of a secondary gas director 576 with a non-symmetrical passageway configuration 549 in which the non-symmetrical passageway configuration 549 results from the omission of passageways 540 at certain otherwise symmetrical locations 544. The various passageways attributes of size 541, shape 542, and angle 543 are identical. In FIG. 3*n*, there are three adjacent vacant locations 544, but any combination of one or more vacant locations 544 can be used to trigger the non-symmetrical flow of air 518 to deflect the particle stream 70.

2. Non-Symmetrical Location

Figure 3O:
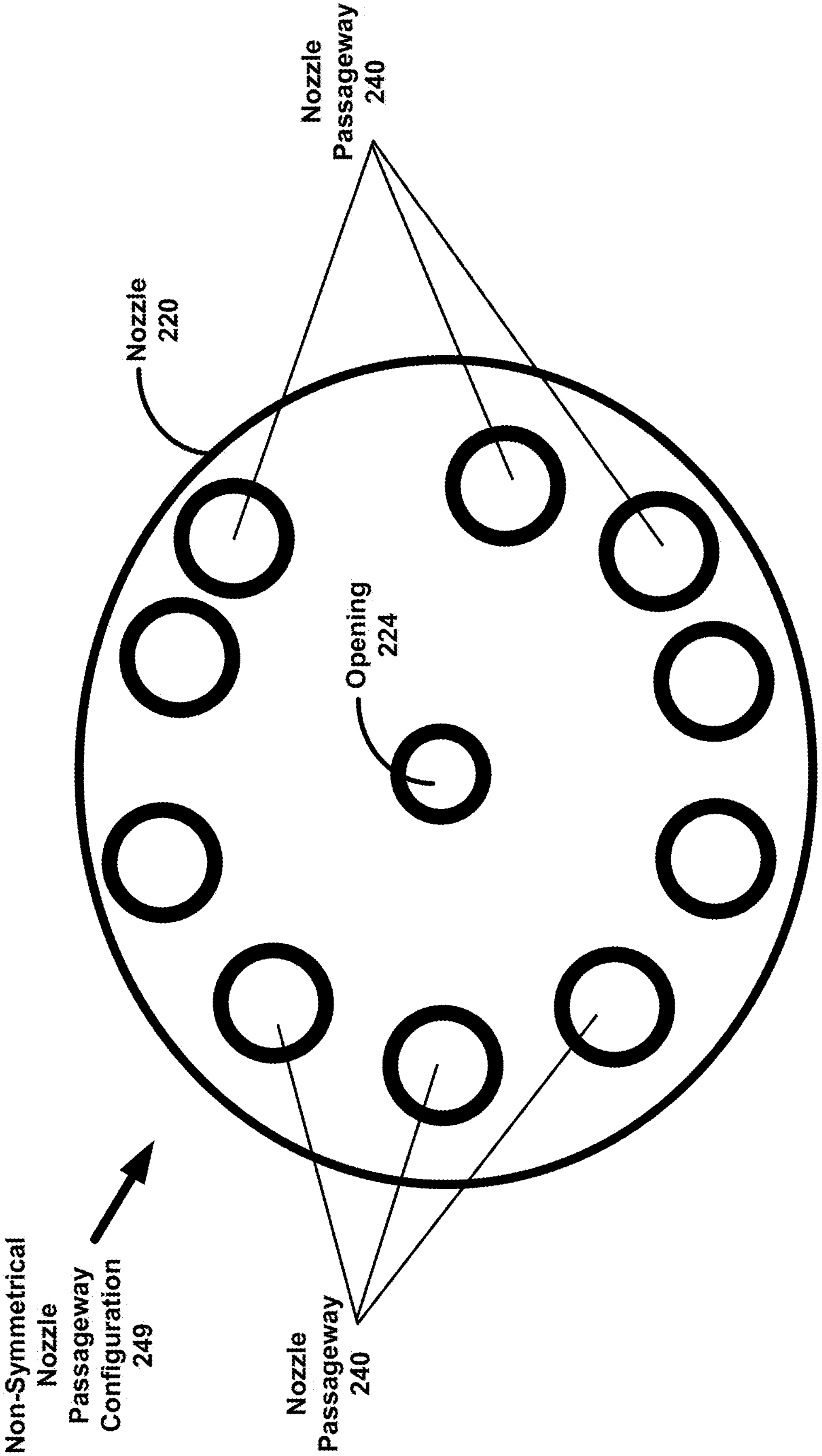
FIG. 3*o* is a face view diagram illustrating an example of a nozzle with a non-symmetrical nozzle passageway configuration in which the nozzle passageways are positioned in non-symmetrical locations.

FIG. 3*o* is a face view diagram illustrating an example of a nozzle 220 with a non-symmetrical passageway configuration 249 in which at least one nozzle passageway 240 is positioned in a non-symmetrical location 244. The nozzle passageways 240 are otherwise identical in their attributes.

Figure 3P:
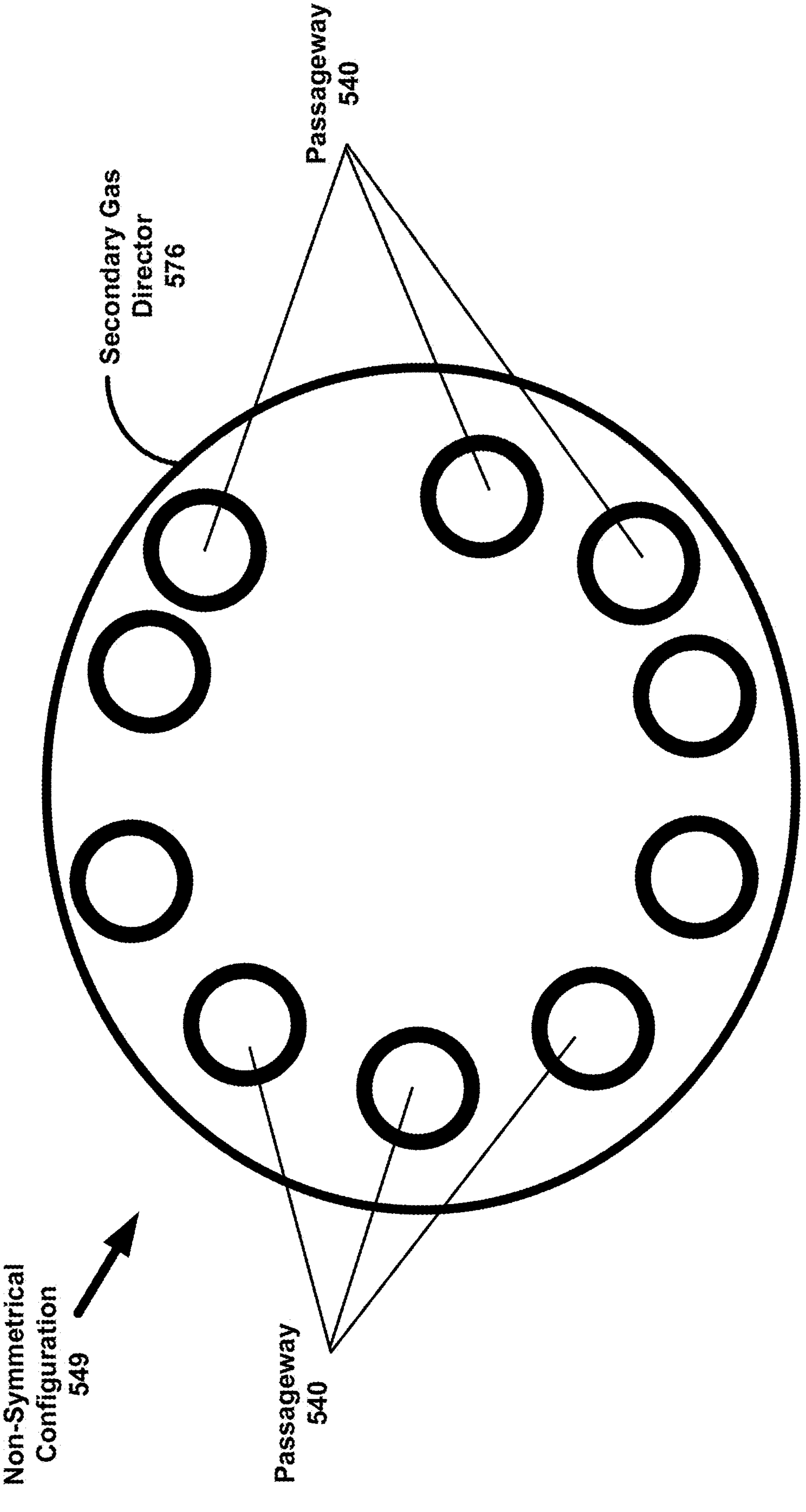
FIG. 3*p* is a face view diagram illustrating an example of a secondary gas director with a non-symmetrical passageway configuration in which the passageways are positioned in non-symmetrical locations.

FIG. 3*p* is a face view diagram illustrating an example of a secondary gas director 576 with a non-symmetrical passageway configuration 549 in which at least one passageway 540 is positioned in a non-symmetrical location 544. The passageways 540 are otherwise identical in their attributes.

G. Inlets

Figure 3Q:
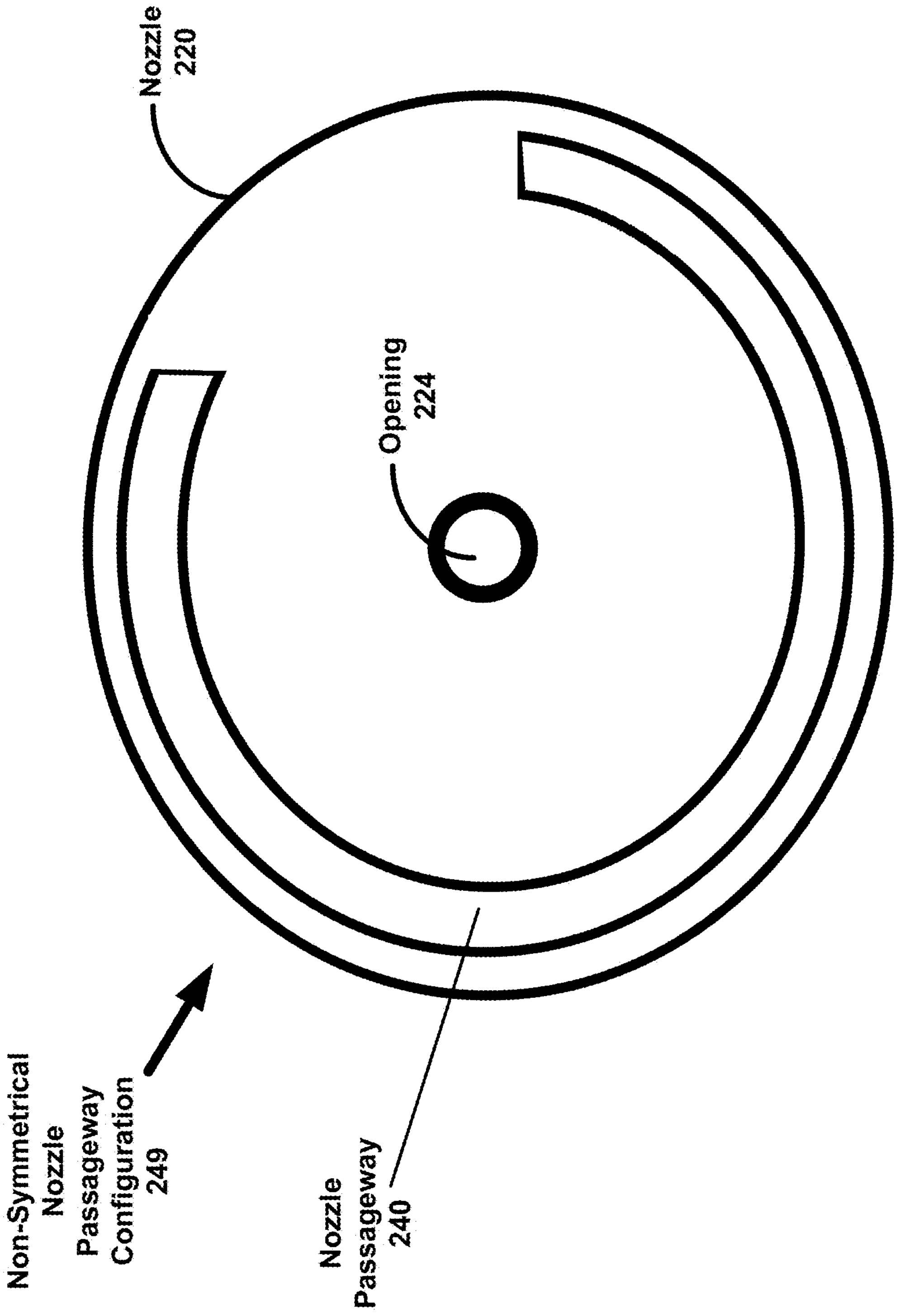
FIG. 3*q* is a face view diagram illustrating an example of a nozzle with a non-symmetrical nozzle passageway configuration in which the configuration includes a single non-symmetrical nozzle passageway.

FIG. 3*q* is a face view diagram illustrating an example of a nozzle 220 with a non-symmetrical nozzle passageway configuration 249 in which the configuration includes a single non-symmetrical nozzle passageway 240. The lack of symmetry is technically the result of the shape 241 of the passageway 240. FIG. 3*s* is a side view diagram that corresponds to the example in FIG. 3*q*. Multiple inlets 245 feed a single nozzle passageway 240. Different embodiments of the system 100 can involve one or more nozzle passageways 240 with different numbers of inlets 245. In many embodiments, each nozzle passageway 240 will have only one inlet 245.

Figure 3R:
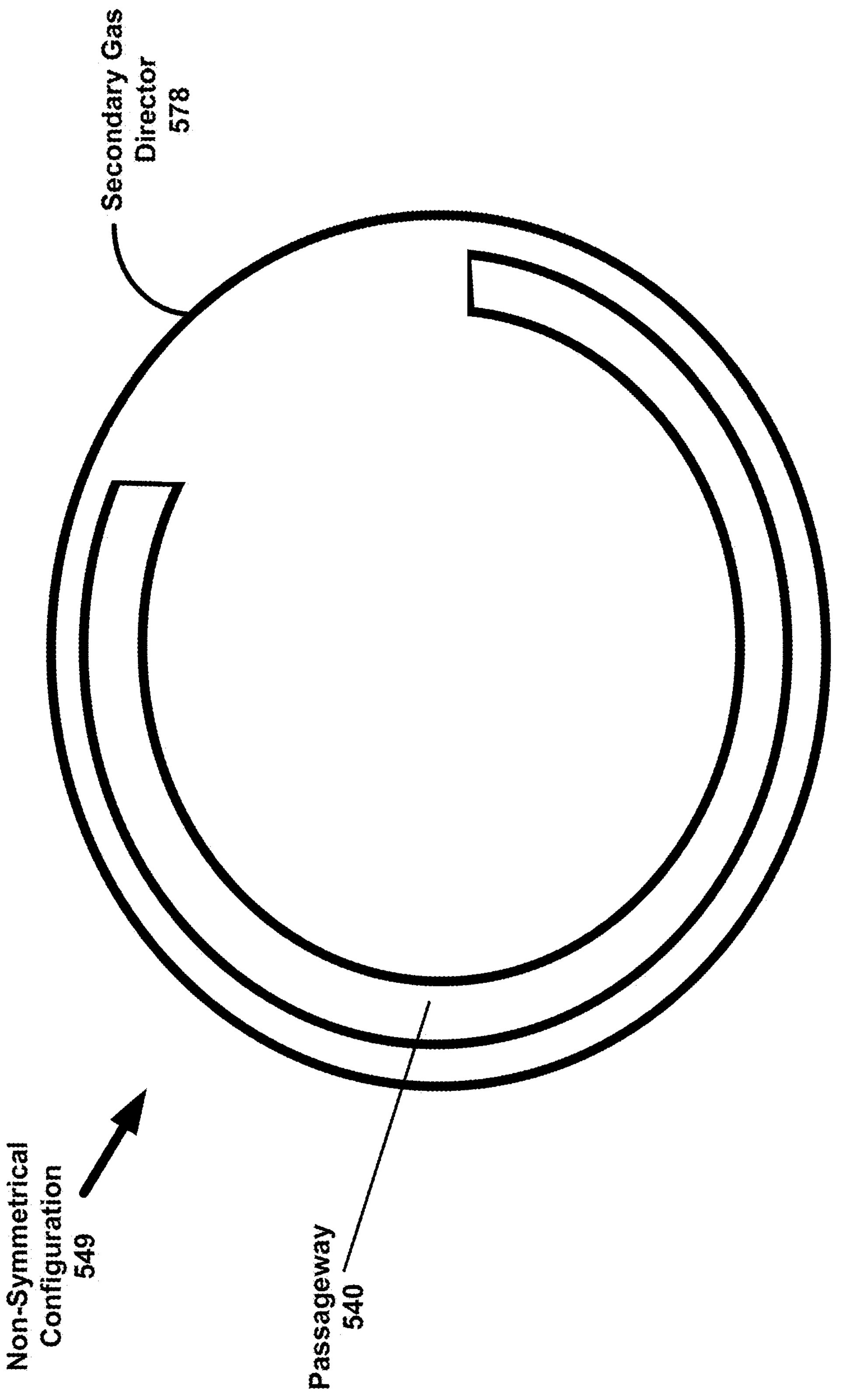
FIG. 3*r* is a face view diagram illustrating an example of a secondary air director with a non-symmetrical passageway configuration in which the configuration includes a single non-symmetrical passageway.
Figure 3S:
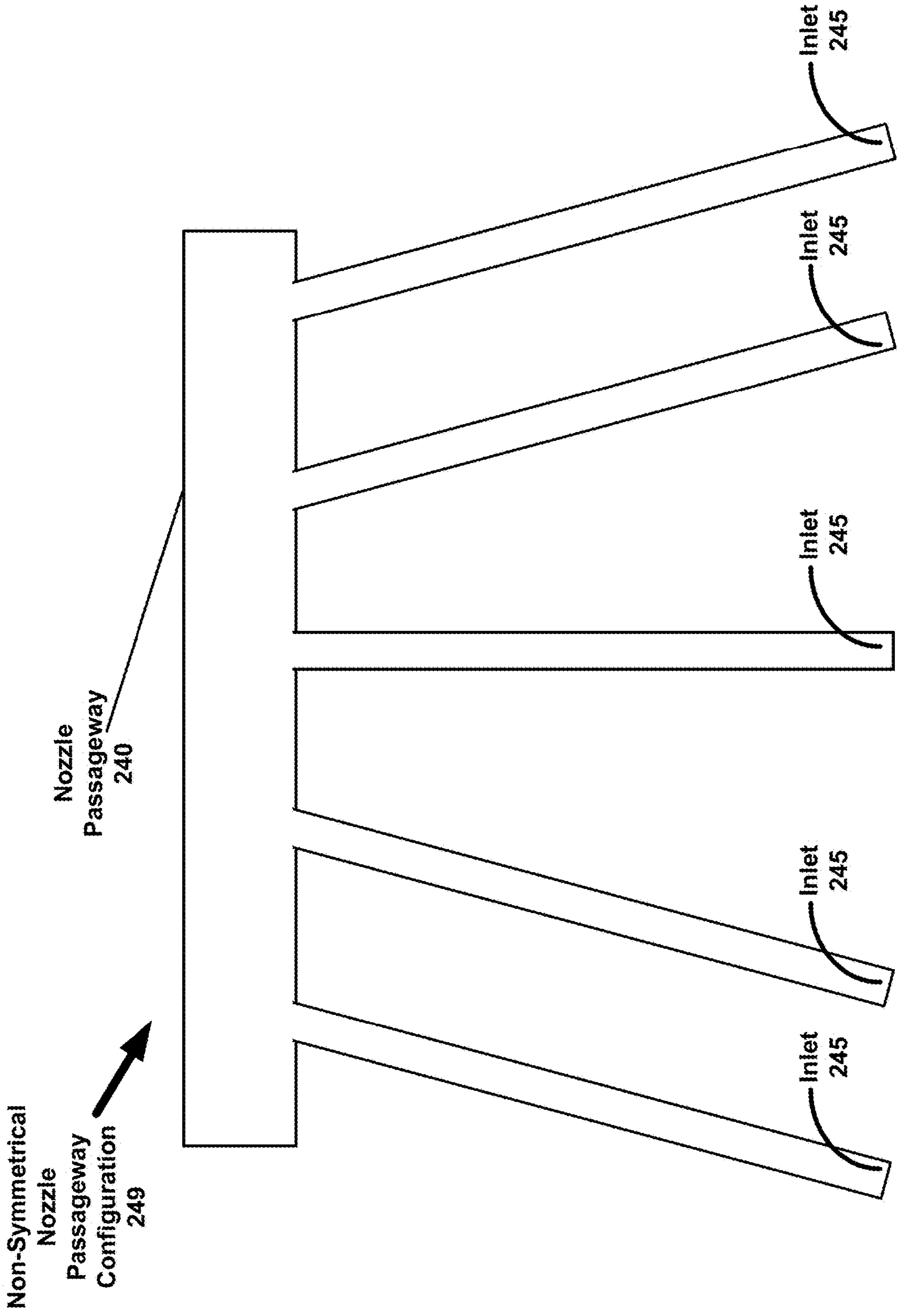
FIG. 3*s* is a side view diagram that corresponds to the example in FIG. 3*q*. Multiple inlets feeding a single nozzle passageway.
Figure 3T:
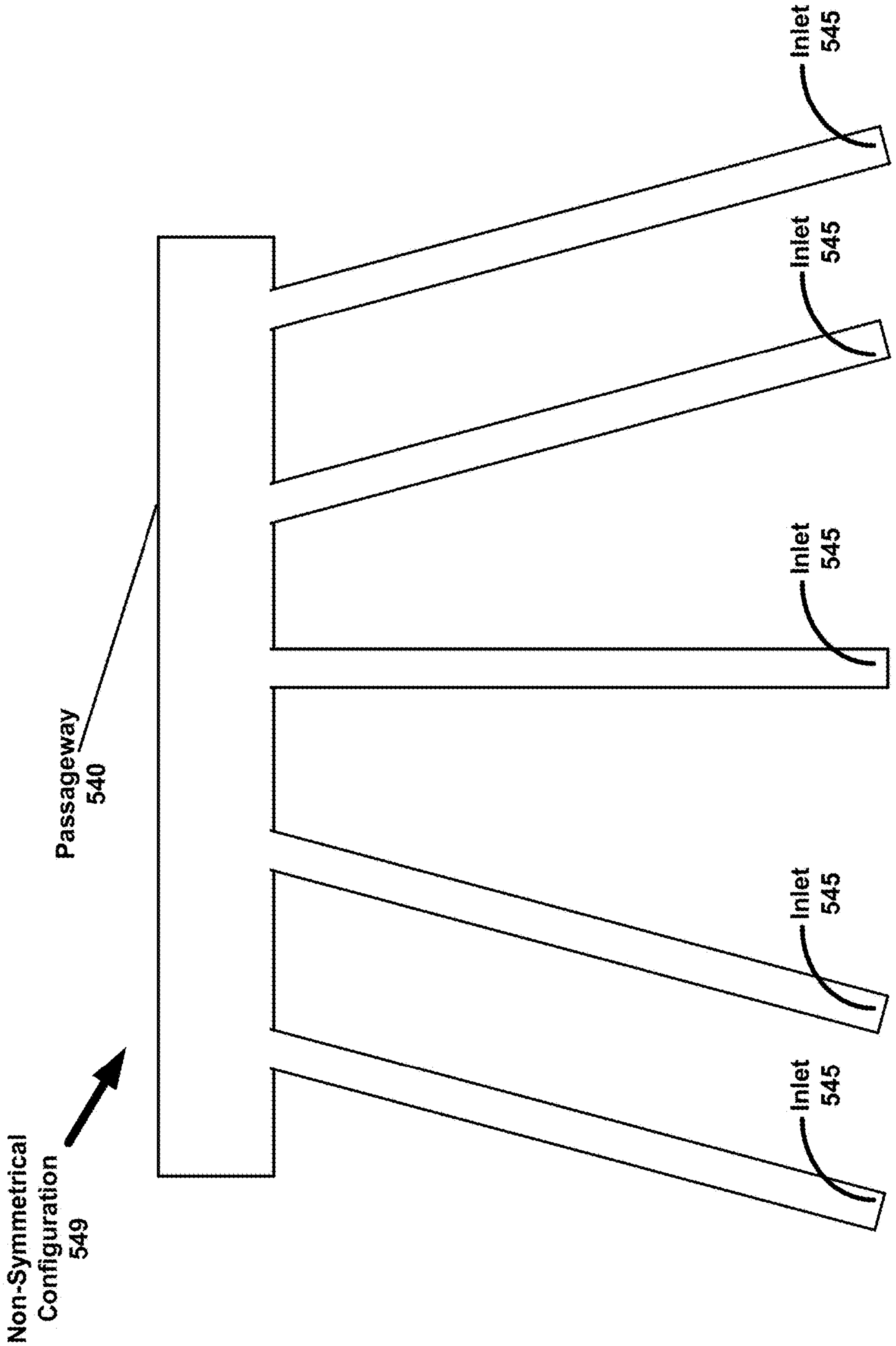
FIG. 3*t* is a side view diagram that corresponds to the example in FIG. 3*r*. Multiple inlets feed a single passageway.

FIG. 3*r* is a face view diagram illustrating an example of a secondary air director 576 with a non-symmetrical passageway configuration 549 in which the configuration includes a single non-symmetrical passageway 540. FIG. 5*r* is similar to FIG. 3*q* except that the passageway 540 in FIG. 3*r* is not within the nozzle 220. FIG. 3*t* is a side view diagram that corresponds to the example in FIG. 3*r*.

FIG. 3*s* is a side view diagram that corresponds to the example in FIG. 3*q*. Multiple inlets 245 feed a single nozzle passageway 240.

FIG. 3*t* is a side view diagram that corresponds to the example in FIG. 3*r*. Multiple inlets 545 feed a single passageway 540.

IV. PROCESS FLOW VIEW

Figure 4:
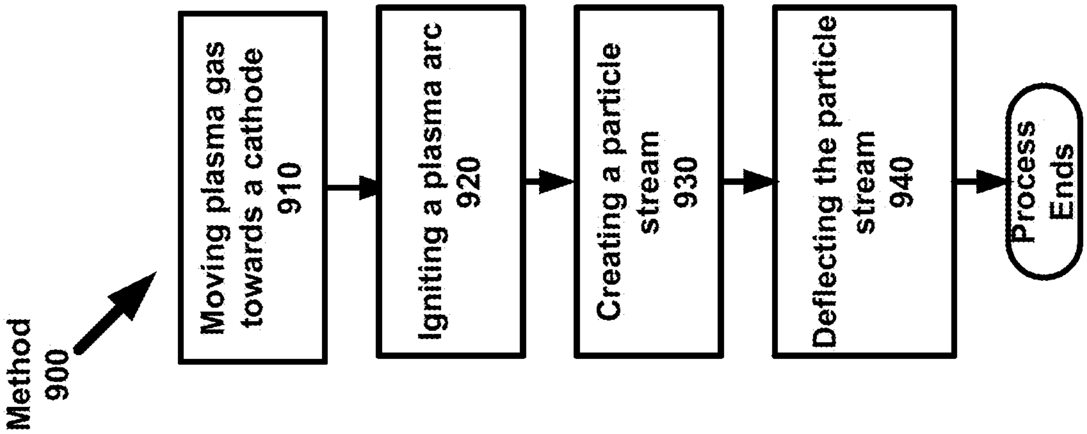
FIG. 4 is a flow chart diagram illustrating an example for deflecting a particle stream through a non-symmetrical passageway configuration.

FIG. 4 is a flow chart diagram illustrating an example for a method 900 for deflecting a particle stream 70 through the use of a non-symmetrical passageway configuration 549. The configuration 549 typically includes multiple passageways 540 that are differentiated on the basis of size 541, shape 542, angle 543, or locations 544. Differentiation based on location 544 can implemented through symmetrical locations 544 where one or more locations 544 are vacant. In other embodiments, the locations 544 are simply not equally spaced. In many instances, the passageways 540 will be nozzle passageways 240, and the non-symmetrical passageway configuration 549 will be the result of a non-symmetrical nozzle passageway configuration 249.

Some embodiments of the method 900 can involve a single passageway 540 that is non-symmetrical on the basis of shape 541, size 542, or angle 543 with respect to different portions of the passageway 540 (the passageway 540 is an aggregated single passageway that is fed through one or more inlets 545).

At 910, plasma gas 512 is moved towards the cathode 212. Plasma gas 514 is necessary for creating a plasma arc 920 necessary to atomize the free end 370 of the wire 310.

At 920, the plasma arc 60 is ignited. This is sometimes done across the gap 61 between the cathode 212 and the wire 310. The plasma arc 60 can also be ignited between the cathode 212 and the nozzle 220 and then the plasma arc 60 can be transferred to the wire 310. The required inputs for the plasma arc 60 are plasma gas 514 and electricity 490.

At 930, a particle stream 70 is created by the melting/atomizing of the free end 370 of the wire 310 by the plasma arc 60.

At 940, the particle stream 70 is deflected with secondary gas 518 such as air so that the particle stream 70 is a deflected particle stream 70. Deflection can be horizontal deflection 91 (left/right), vertical deflection 92 (up/down), or both at the same time. Deflection can be implemented through a wide range of different non-symmetrical passageway configurations 549 based on differences in one or more configuration attributes. The magnitude of the deflection of the particle stream 70 can also be influenced by the secondary gas pressure, temperature, and other factors.

V. HORIZONTAL DEFLECTION RELATIVE TO A ROTATING CATHODE

Deflection is particularly interesting when it is done horizontally on a system 100 that involves a cathode 212 that rotates around a wire 310 in a trajectory that can be referred to as an orbit or rotation 280.

Figure 5A:
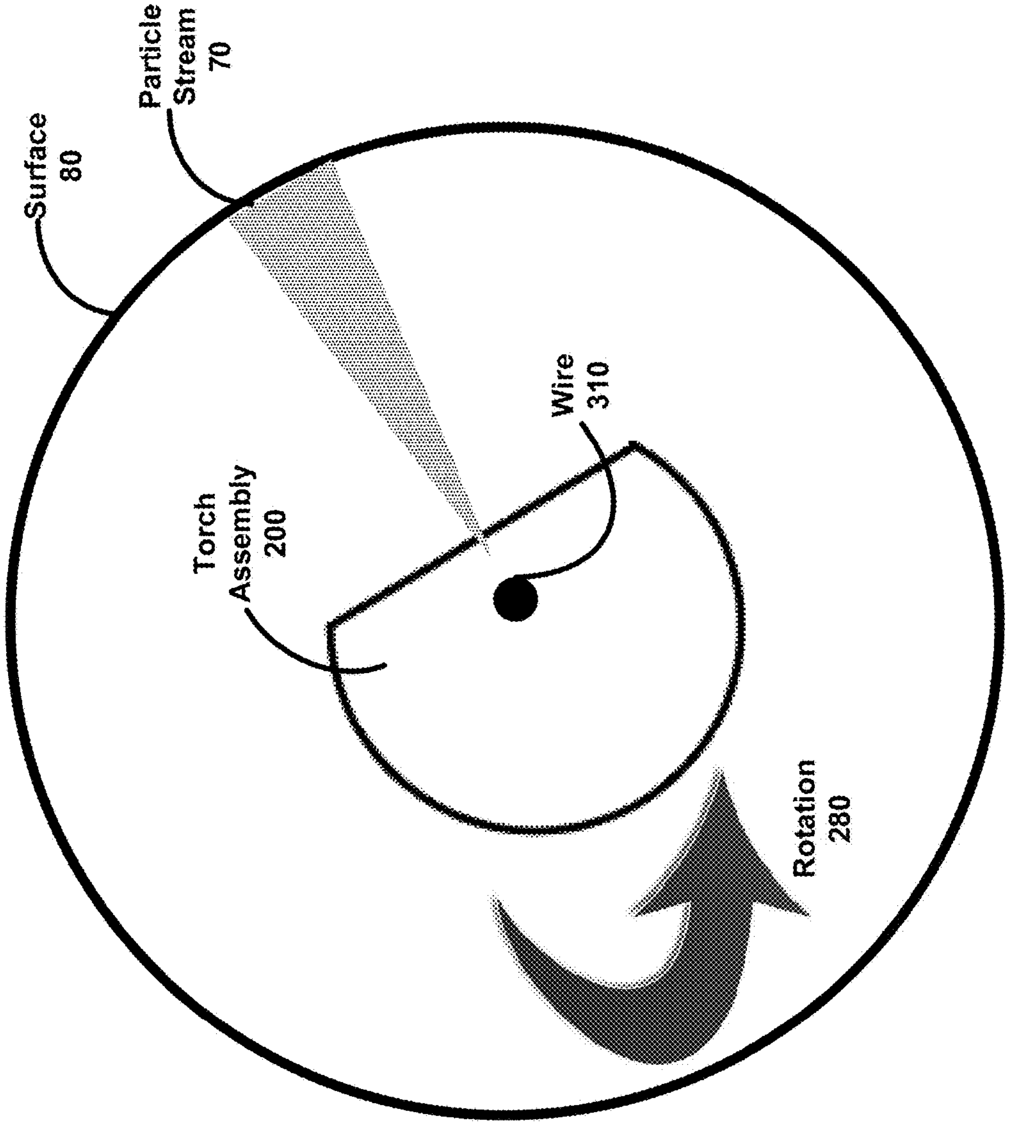
Prior Art Figure 5a
FIG. 5*a* is top-view diagram illustrating an example a prior art apparatus in which the particle stream is not deflected. This is a view of the particle stream in the horizontal plane

FIG. 5*a* is top-view diagram of the horizontal plane illustrating an example a prior art apparatus 50 in which the particle stream 70 is not deflected.

Figure 5B:
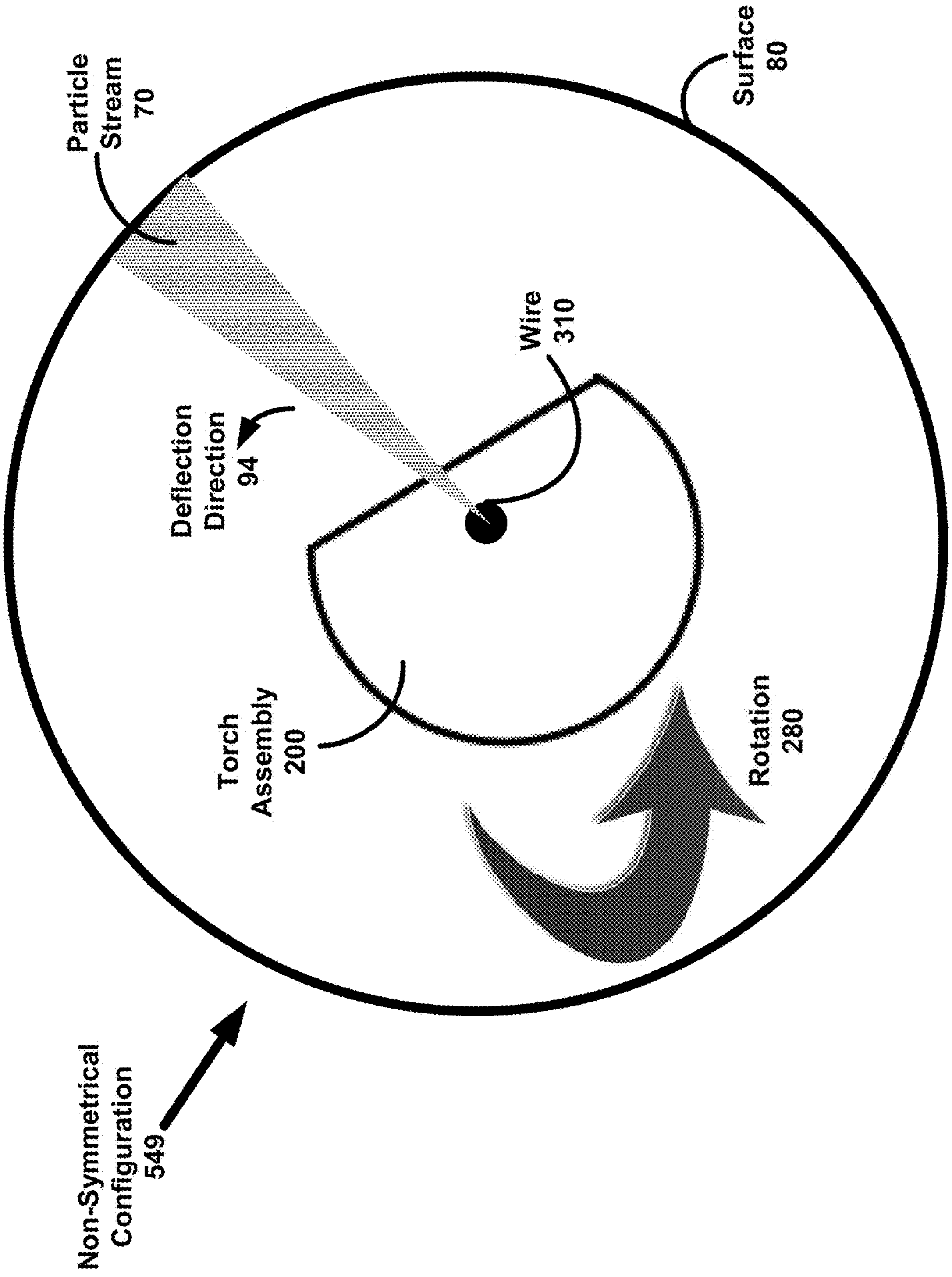
FIG. 5*b* is a top-view diagram illustrating an example of a particle stream that is deflected in the same direction in which the cathode rotates. As with FIG. 5*a*, this is a view of the particle stream in the horizontal plane.

FIG. 5*b* is a top-view diagram illustrating an example of a particle stream that is deflected in the same direction in which the cathode 212 rotates 280. In other words, the deflection direction 94 of the deflected particle stream 90 is the same as the rotation direction 280. The density of the coating 82 (which can also be referred to as the deposit 82) on the surface 80 can be enhanced.

Figure 5C:
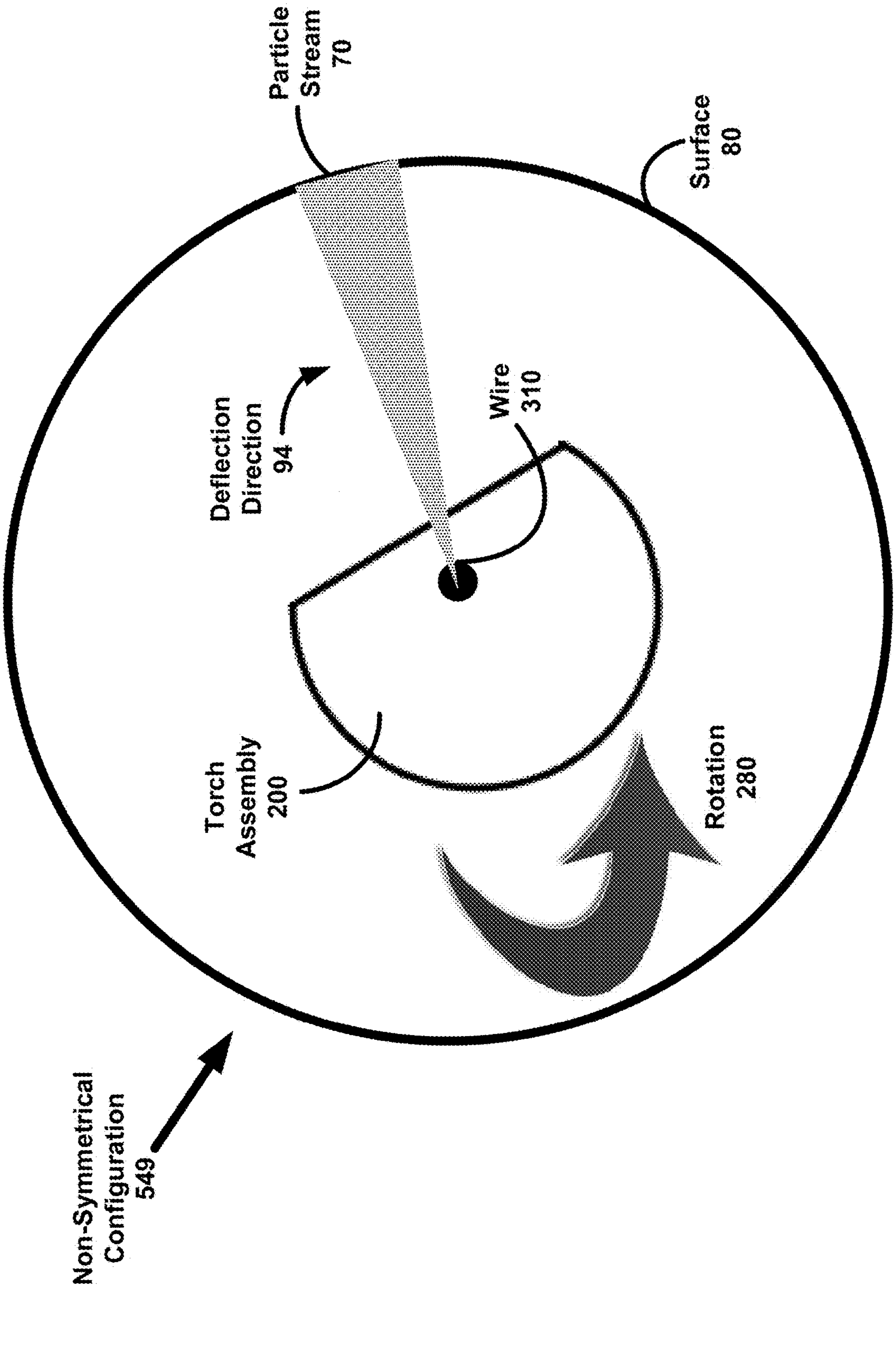
FIG. 5*c* is a top-view diagram illustrating an example of a particle stream that is deflected in the direction opposite to the rotation of the cathode. As with FIGS. 5*a* and 5*b*, this is a view of the particle stream in the horizontal plane.

FIG. 5*c* is a top-view diagram illustrating an example of a particle stream that is deflected in the direction opposite to the rotation of the cathode 212. In other words, the deflection direction 94 of the deflected particle stream 90 is opposite to the rotation direction 280. A deflected particle stream 90 differs in several respects from a non-deflected particle stream 70. A deflected particle stream 90 increases the porosity of the coating 82 (which can also be referred to as the deposit 82) on the surface 80 being sprayed. Such a particle stream 90 is less collimated, with a wider and non-symmetrical spay pattern. Also, by creating a less collimated spray pattern there is less localized heating of the surface 80. In addition, not all of the particles in the particle stream 90 will adhere to the surface 80, and the particles that do not adhere will be deflected and/or splash off the surface 80. With a deflected particle stream 90 these particles not adhering to the surface 80 are less likely to build up on the face of the nozzle 220. In addition, by performing horizontal deflection 91 as opposed to vertical deflection 92, there will be less buildup of these particles not adhering to the surface on the torch body 202 above the nozzle 220.

VI. ASSEMBLY VIEW

The system 100, which includes the nozzle 220 with a non-symmetrical passageway configuration 249 can be implemented in a variety of different ways using a variety of different assemblies, with each assembly having a variety of different viable operating environments.

A. Component Views

Figure 6A:
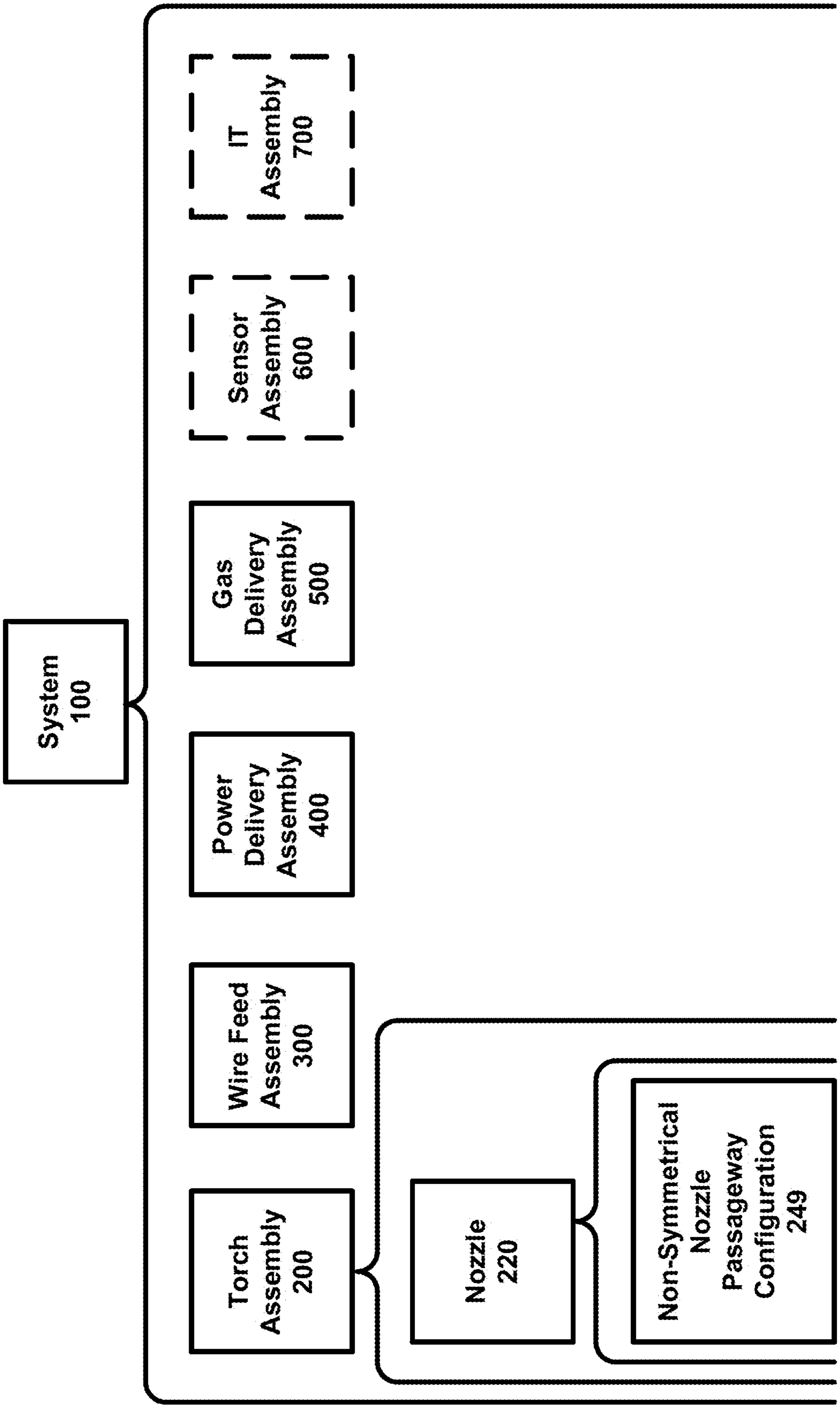
FIG. 6*a* is a block diagram illustrating an example of the different assemblies that be included in the system, and in which the nozzle within the torch assembly has a non-symmetrical nozzle passageway configuration.

As illustrated in FIG. 6*a*, the system 100 or a corresponding apparatus 110, can be implemented while including a torch assembly 200, a wire feed assembly 300, a power delivery assembly 400, a gas delivery assembly 500, and in some embodiments, a sensor assembly 600 and an IT assembly 700. The nozzle 220 is a component of the torch assembly 200, although it includes nozzle passageways 240 for the direction of secondary gas 518 to the particle stream 70. As illustrated in the Figure, the non-symmetrical nozzle passageway configuration 249 is an attribute of the torch assembly 200, which includes the nozzle 220.

Figure 6B:
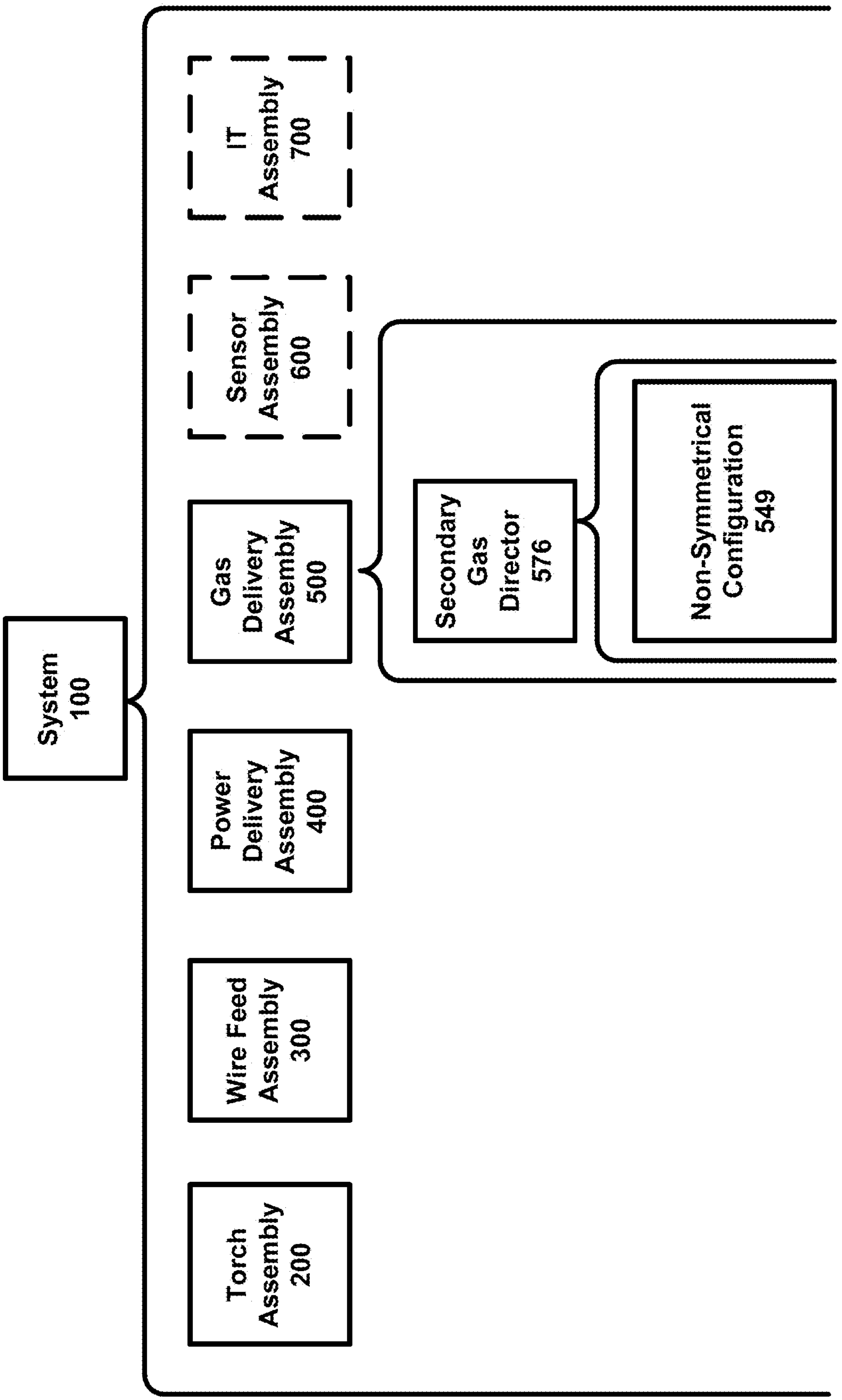
FIG. 6*b* is a block diagram illustrating an example of the different assemblies that be included in the system, and in which the secondary gas director within the gas assembly has a non-symmetrical passageway configuration.

The illustration of FIG. 6*b* is similar to that of FIG. 6*a*, except that the non-symmetrical attributes exist outside the nozzle 220 and within a secondary gas director 570 that is part of the gas assembly.

B. Schematic Views

Figure 6C:
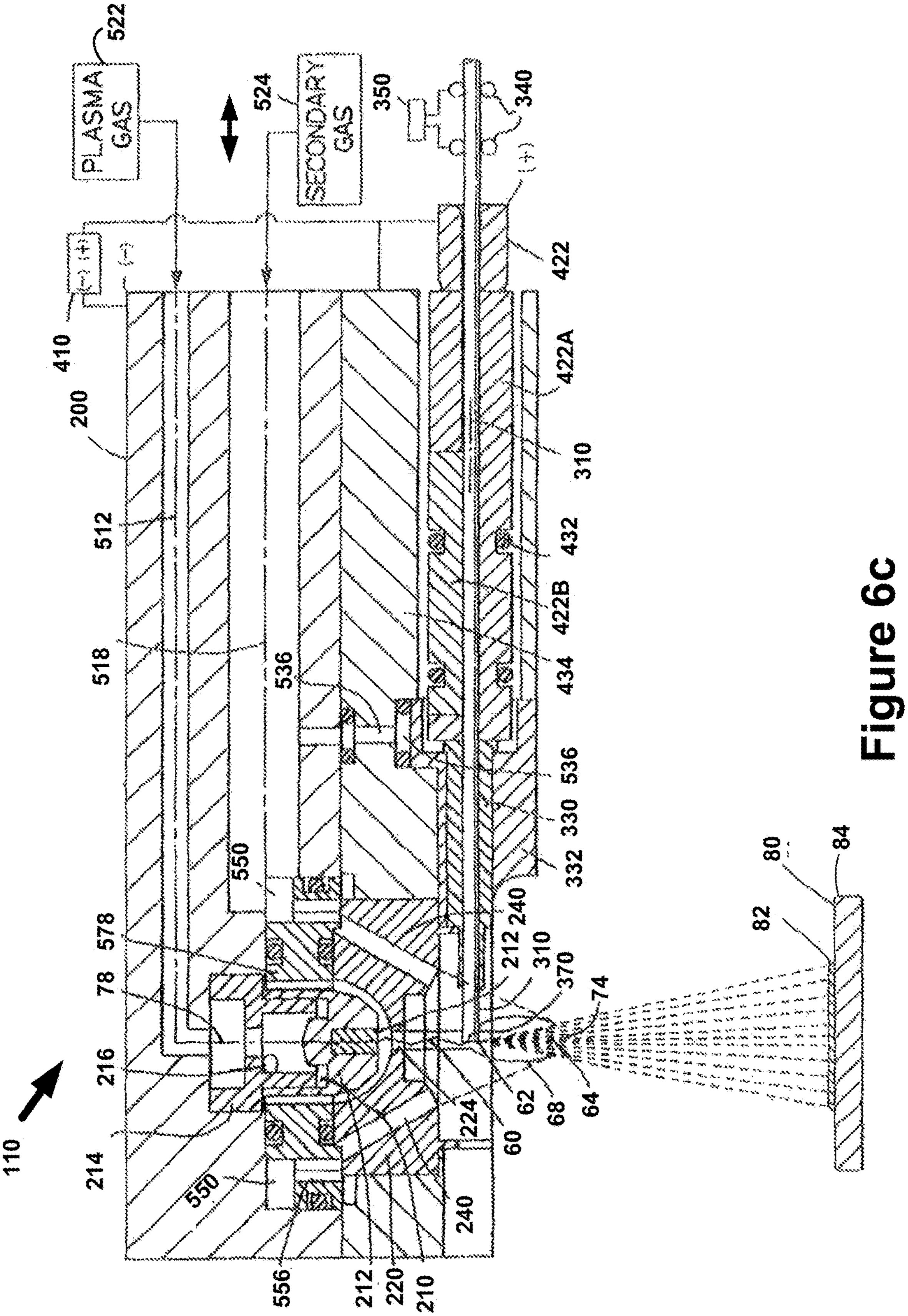
FIG. 6*c* is a schematic diagram illustrating an example of the system.
Figure 6D:
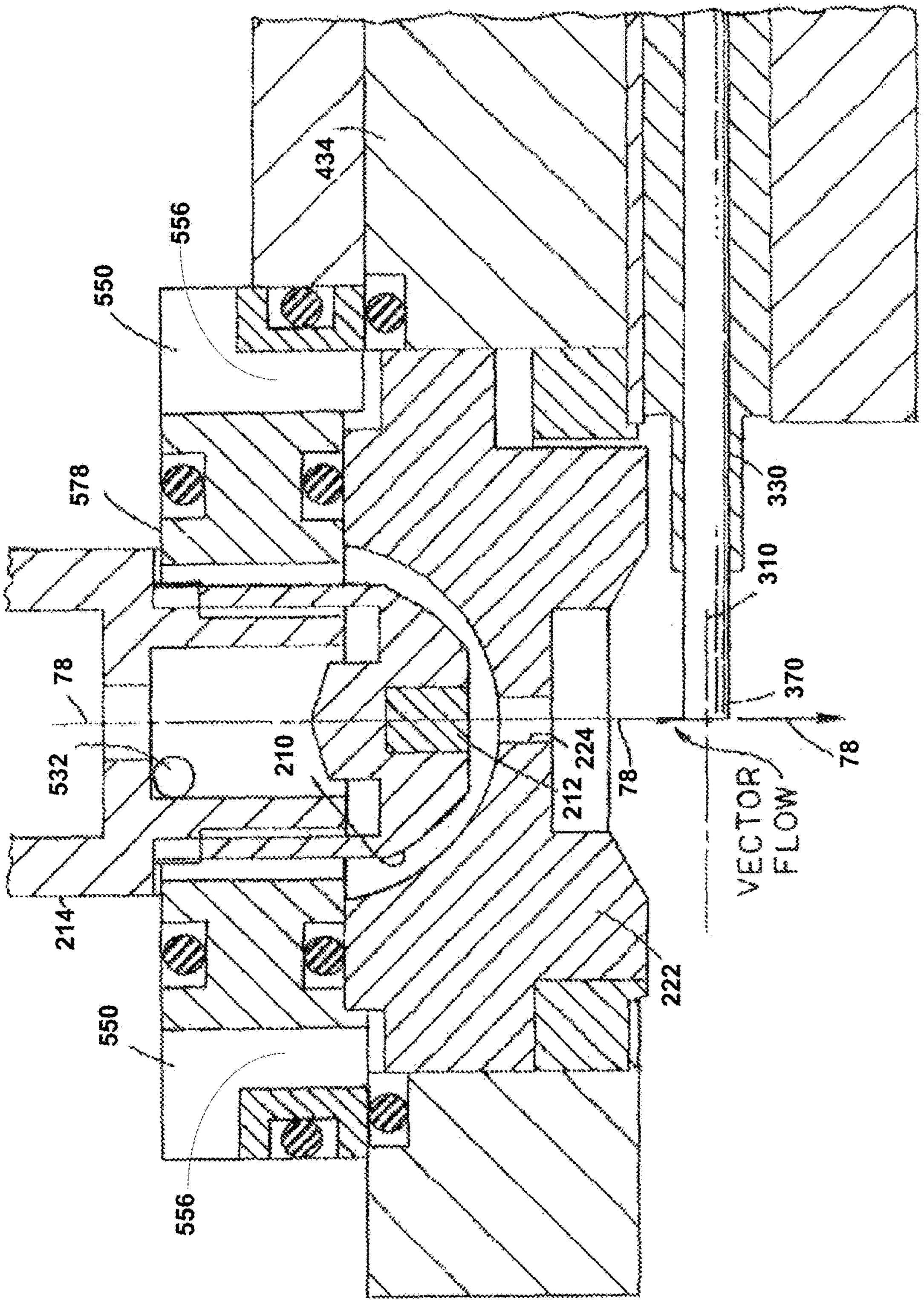
FIG. 6*d* is an enlarged representation of a portion of FIG. 6*b*.

FIG. 6*c* is a schematic diagram illustrating an example of the system. FIG. 6*d* is an enlarged representation of a portion of FIG. 6*c*.

The apparatus 110 includes a torch assembly 200 containing a plasma gas port 532 and a secondary gas port 534. The torch body 202 is typically formed of an electrically conductive metal. The plasma gas 512 is connected by means of a plasma gas port 532 to a cathode holder 214 through which the plasma gas 512 flows into the inside of the cathode subassembly 210 and exits through gas ports 216 located in the cathode holder 214. The plasma gas 512, which typically forms a vortex flow between the outside of the cathode subassembly 210 and the internal surface of the plasma nozzle 222, and then it exits through the constricting orifice 224. The plasma gas vortex provides substantial cooling of the heat being generated by the functioning of the cathode 212.

Secondary gas 518 enters the torch assembly 200 through secondary gas ports 534 which direct the secondary gas 518 to a gas manifold 550 (a cavity formed between a baffle plate 578 and the torch body 202 and then through bores 556 in the baffle 578. In a symmetrical configuration, the secondary gas 518 flow is uniformly distributed through the equiangularly spaced passageways 540 concentrically surrounding the outside of the constricting orifice 224. In a non-symmetrical passageway configuration 549, the flow of the secondary gas 518 is not uniformly distributed.

Wire feedstock 320 is used supply the plasma arc 60 with the material that is sprayed onto the surface 84. The wire 310 is directed by rollers 340 that are powered by a speed-controlled motor 350. The wire 310 moves through a wire contact tip 422 which is in electrical contact to the wire 310 as it slides through the wire contact tip 422. In this embodiment, the wire contact tip 422 is composed of two pieces, 422A and 422B, held in spring or pressure load contact with the wire 310 by means of one or more rubber rings 432 or other suitable means. The wire contact tip 422 is made of high electrically conducting material. As the wire 310 exits the wire contact tip 422, it enters a wire guide tip 330 for guiding the wire 310 into a desired alignment with the axial centerline 76 of the constricting orifice 224. The wire guide tip 330 can be supported in a wire guide tip block within an insulating block 434 which provides electrical insulation between the torch body 202, which is held at a negative electrical potential, while the wire guide tip block 332 and the wire contact tip 422 are held at a positive potential. In other embodiments, the wire guide tip 330 can be structurally integral with the nozzle 220. A small port 536 in the insulator block 434 allows a small amount of secondary gas 518 to be diverted through the wire guide tip block 332 in order to provide heat removal from the block 332. This can also be done via a bleed gas 510 around or through the nozzle 220. In some embodiments, the wire guide tip block 332 can be maintained in pressure contact with the plasma nozzle 222 to provide an electrical connection between the plasma nozzle 222 and the wire guide tip block 332. Electrical connection is made to the torch body 202 and thereby to the cathode subassembly 210 (which includes the cathode 212) through the cathode holder 214 from the negative terminal of the power supply 410. In some embodiments, the power supply 410 may contain both a pilot power supply and a main power supply operated through isolation contactors. Positive electrical connection can be made to the wire contact tip 422 from the positive terminal of the power supply 410. Wire 310 is fed toward the axial centerline 76 of the constricting orifice 224, which is also the axis of the plasma plume 62. Concurrently, the cathode subassembly 210 is electrically energized with a negative charge and the wire 310, as well as the plasma nozzle 222 although the plasma nozzle 222 can be isolated, it can be electrically charged with a positive charge. The wire guide tip 330 and wire 310 can be positioned relative to the plasma nozzle 222 by many different methods. In one embodiment, the plasma nozzle 222 itself can have features for holding and positioning of the wire guide tip 330. The torch body 202 may be desirably mounted on a power rotating support (not shown) which revolves the torch around the wire axis to coat the interior of bores.

To initiate operation of the apparatus 110, plasma gas 512 at an inlet gas pressure of between 35 and 140 psig is caused to flow through the plasma gas ports 532, typically creating a vortex flow of the plasma gas 512 about the inner surface of the plasma nozzle 222 and then, after an initial period of time of typically two seconds, high-voltage DC power or high frequency power is connected to the electrodes creating the plasma arc 60. Wire 310 is fed by means of wire feed rollers 340 into the plasma arc 60 sustaining it even as the free end 370 is melted off by the intense heat of the plasma arc 60 and its associated plasma 68 which surrounds the plasma arc 60. Molten metal particles can be formed on the free end 370 of the wire 310 which are then atomized into fine, particles 74 by the viscous shear force established between the high velocity, ionized plasma gas 516 and the initially, stationary molten droplets. The molten particles can be further atomized and accelerated by the much larger mass flow of secondary gas 518 through passageway 540 which converge at a location or zone beyond the melting of the wire free end 370, now containing the finely atomized particles 74, which are propelled to the substrate surface 80 to form a deposit 82 on a desired substrate 84.

The wire 310 can be melted with the particles 70 being carried and accelerated by vector forces 66 in the same direction as the plasma arc 60. A uniform dispersion 70 of fine particles 74, without aberrant globules 72, can be obtained. The vector forces 66 are the axial force components of the plasma arc energy and the high level converging secondary gas 518 streams. However, under some conditions, instabilities occur where particles from the melted wire free end 370 are not uniformly melted as the cathode subassembly 210 is rotated around the rotational centerline 206 of the wire 310 whereby some part of the wire free end 370 is accelerated away from the free end 370 in larger droplets 72 which are not atomized into fine particles 74. These large particles or droplets 72 are propelled as large agglomerate masses toward the substrate 84 and are included into the coating (i.e. deposit 82) as it is being formed, resulting in coating of poor quality.

As indicated earlier, high velocity secondary gas 518 is released from typically equi-angularly spaced bores 556 to project a curtain of secondary gas 518 streams about the plasma arc 60. The supply 524 of secondary gas 518, such as air, is introduced into the chamber 550 under high flow, with a pressure of about 20-120 psi. The chamber 550 (i.e. gas manifold 550) acts as a plenum to distribute the secondary gas 518 to the series of typically equi-angularly spaced passageways 540 which direct the secondary gas 518 as a concentric converging stream which assists the atomization and acceleration of the particles 70. Each passageway 540 can have an internal diameter of about 0.040-0.090 inches and projects a high velocity air flow at a flow rate of about 10-60 scfm from the total of all of the passageway 540 combined. The plurality of passageways 540, typically ten in number, are located concentrically around the constricting orifice 224, and are radially and substantially equally spaced apart. To avoid excessive cooling and turbulence in the arc zone at the plasma arc 60, these streams are typically radially located so as not to impinge directly on the wire free end 370. The passageways 540 are spaced angularly apart so that the wire free end 370 is centered midway between two adjacent passageways 540, when viewed along the axial centerline 76 of the constricting orifice 224. Thus, as shown in FIG. 6*d*, nozzle passageways 240 will not appear because the section plane is through the wire 310. FIG. 6*c* shows the nozzle passageways 240 only for illustration purposes and it should be understood they are shown out of position (typically 18 degrees for a nozzle 220 with 10 radial nozzle passageways 240) and are not in the section plane for this view. The converging angles of the streams of secondary gas 518 are typically about 30 degrees relative to the center vector 78, permitting the secondary gas 518 to engage the particles 70 downstream of the wire-plasma intersection zone 64.

FIG. 6*d* is an enlarged representation of a portion of FIG. 6*c*. FIG. 6*d* focuses more on the components surrounding the cathode 212 and the nozzle 220, which is a plasma nozzle 222. There are passageways 540 in the gas manifold 550 through which secondary gas 518 is directed towards the particle stream 70. The gas manifold 550 includes a baffle plate 578. Plasma gas 512 enters the figure through a plasma gas port 532. The view also includes an insulating block 434.

A cathode assembly 210 includes the cathode holder 214 which secures the position of the cathode 212. Down from the opening 224 in the nozzle 220 (the plasma nozzle 222) is the wire 310 which moves through the guide tip 330. The free end 370 of the wire 310. The center vector 78 is illustrated as a dotted line bisecting the cathode 212 down to the free end 370 of the wire 310

VII. ALTERNATIVE EMBODIMENTS

The system 100 can be implemented with respect to virtually any prior art apparatus 50. The system 100 can be implemented using a wide variety of different assemblies, components, and component configurations. The system 100 can also be implemented using a variety of different non-symmetrical passageway configurations 549 to deflect the particle stream 70 in a horizontal and/or vertical manner.

No patent application can disclose through text descriptions or graphical illustrations all of the potential embodiments of an invention. In accordance with the provisions of the patent statutes, the principles and modes of operation of the system are explained and illustrated with respect to certain preferred embodiments. However, it must be understood that the components, configurations, and methods described above and below may be practiced otherwise than is specifically explained and illustrated without departing from its spirit or scope. Each of the various components, assemblies, and other elements described in the glossary set forth in Table 1 above can be implemented in a variety of different ways while still being part of the spirit and scope of the invention.

The invention claimed is:

1. A plasma spray system (100) for projecting a horizontally deflected particle stream (91) onto a surface (80) using a plurality of gases (510) that include a plasma gas (512) and a secondary gas (518), said plasma spray system (100) comprising:

a cathode (212);

a wire (310) that includes a free end (370), a horizontal plane perpendicular to said wire (310) in which said cathode (212) rotates around said free end (370) of said wire (310), wherein said horizontally deflected particle stream (91) is deflected either (a) in the direction of the rotation of the cathode (212) or (b) opposite to the direction of the rotation of the cathode (212);

a nozzle (220) that includes a nozzle face with an opening (224); and a non-symmetrical passageway configuration (549) that causes said secondary gas (518) flowing through said non-symmetrical passageway configuration (549) to deflect said horizontally deflected particle stream (91), wherein said plasma gas (512) is directed to said cathode (212) to create a plasma arc (60) between said free end (370) of said wire (310) and said cathode (212);

wherein said deflected particle stream (90) is created by said plasma arc (60) melting said free end (370) of said wire (310).

2. The plasma spray system (100) of claim 1, said non-symmetrical passageway configuration (549) further including a plurality of said passageways (540) that are in a plurality of passageway sizes (541), said plurality of passageways (540) including a first passageway (540) and a second passageway (540), said plurality of passageway sizes (541) including a first passageway size (541) and a second passageway size (541), wherein said first passageway (540) is of said first passageway size (541), wherein said second passageway (540) is of said second passageway size (541), and wherein said first passageway size (541) is not identical to said second passageway size (541).

3. The plasma spray system (100) of claim 1, said non-symmetrical passageway configuration (549) further including a plurality of said passageways (540) that are in a plurality of passageway shapes (542), said plurality of passageways (540) including a first passageway (540) and a second passageway (540), said plurality of passageway shapes (542) including a first passageway shape (542) and a second passageway shape (542), wherein said first passageway (540) is of said first passageway shape (542), wherein said second passageway (540) is of said second passageway shape (542), and wherein said first passageway shape (542) is not identical to said second passageway shape (542).

4. The plasma spray system (100) of claim 1, said non-symmetrical passageway configuration (549) further including a plurality of said passageways (540) that are positioned in a plurality of passageway angles (543), said plurality of passageways (540) including a first passageway (540) and a second passageway (540), said plurality of passageway angles (543) including a first passageway angle (543) and a second passageway angle (543), wherein said first passageway (540) is at said first passageway angle (543), wherein said second passageway (540) is at said second passageway angle (543), and wherein said first passageway angle (543) is not identical to said second passageway angle (543).

5. The plasma spray system (100) of claim 1, said non-symmetrical passageway configuration (549) further including a plurality of said passageways (540) and a plurality of symmetrically spaced locations (545), wherein at least one said symmetrically spaced location (544) does not have any said passageway (540).

6. The plasma spray system (100) of claim 1, wherein said horizontally deflected particle stream (91) forms a coating (82) on the surface (80), wherein the deflection increases a porosity of the coating (82).

7. The plasma spray system (100) of claim 1, wherein said cathode (212) rotates around said wire (310) in a direction that is opposite to a deflection direction (94).

8. The plasma spray system (100) of claim 1, wherein said cathode (212) rotates around said wire (310) in a direction that is in the same direction as a deflection direction (94).

9. The plasma spray system (100) of claim 1, wherein said opening (224) of said nozzle (220) is not perpendicular to the surface (80).

10. The plasma spray system (100) of claim 1, wherein there is no more than one said wire (310), and wherein a rotational centerline (206) of an orbit (280) of said cathode (212) is off center from said wire (310).

11. The plasma spray system (100) of claim 1, wherein said deflected particle stream (90) has a deflection angle (96) that is at least one of: (a) greater than 5 degrees; and (b) less than −5 degrees.

12. The plasma spray system (100) of claim 1, wherein said horizontally deflected particle stream (91) results in an increased porosity of the surface (80) being sprayed with said horizontally deflected particle stream (91).

13. The plasma spray system (100) of claim 1, wherein said horizontal deflection (91) results in a widening of said horizontally deflected particle stream (91).

14. The plasma spray system (100) of claim 1, wherein said non-symmetrical configuration of passageways (549) results in a reduction of collimation in said horizontally deflected particle stream (91).

15. The plasma spray system (100) of claim 1, wherein said horizontally deflected particle stream (91) is also a vertically deflected particle stream (92).

16. The plasma spray system (100) of claim 1, wherein said non-symmetrical passageway configuration (549) is the result of a non-symmetrical nozzle passageway configuration (250) within said nozzle (220).

17. A plasma spray apparatus (110) for projecting a deflected particle stream (90) onto a surface (80), said plasma spray system (100) comprising:

a plurality of gases (510) that includes a plasma gas (512) and a secondary gas (518);

a wire (310) that includes a free end (370);

a cathode (212);

a horizontal plane perpendicular to said wire (310) in which said cathode (212) rotates around said free end (370) of said wire (310) while said plasma arc (60) melts said free end (370) of said wire (310); and a nozzle (220) that includes a nozzle face, an opening (224) in said nozzle face, and a non-symmetrical nozzle passageway configuration (249) that includes a non-symmetrical nozzle passageway (240), said non-symmetrical nozzle passageway configuration (249) causing said secondary gas (510) to horizontally deflect said deflected particle stream (90) in a deflection direction (94) within said plane of rotation that is either (a) in the same direction as the movement of said cathode (212) or (b) in the opposite direction as the movement of said cathode;

wherein said plasma gas (512) is directed to said cathode (212) to create a plasma arc (60) between said free end (370) of said wire (310) and said cathode (212);

wherein said deflected particle stream (90) is a horizontally deflected particle stream (91).

18. The plasma spray apparatus (110) of claim 17, wherein said horizontally deflected particle stream (91) is in the opposite direction to the rotation of said cathode (212) around said wire (310).

19. A method (900) of projecting a particle stream (70) onto a surface (80) using a plurality of gases (510) that include a plasma gas (512) and a secondary gas (518), said method (900) comprising:

moving (910) said plasma gas (512) towards a cathode (212), wherein the cathode (212) is in a horizontal plane that is perpendicular to a wire (310) that includes a free end (370), and wherein the cathode (212) rotates around said free end (370) of the wire (310) in said horizontal plane;

igniting (920) a plasma arc (60) with said plasma gas (512);

creating (930) said particle stream (70) by melting said free end (370) of said wire (310) in contact with said plasma arc (60); and horizontally deflecting (940) said particle stream (70) by directing said secondary gas (518) through a non-symmetrical passageway configuration (549) that includes at least one passageway (540), wherein said non-symmetrical passageway configuration (549) includes a nozzle (220) that includes an opening (224), wherein said particle stream (70) is a horizontally deflected particle stream (91) that is deflected either (a) in the direction of the rotation of the cathode (212) or (b) opposite to the direction of the rotation of the cathode (212).

20. The method (900) of claim 19, wherein said cathode (212) rotates around said wire (310), and wherein said horizontally deflected particle stream (91) has a deflection angle (96) of at least one of: (a) greater than 10 degrees; and (b) less than −10 degrees.

* * * * *